United States Patent
Williams et al.

(10) Patent No.: US 9,441,769 B2
(45) Date of Patent: Sep. 13, 2016

(54) METHOD OF ASSEMBLING CONDUIT FITTING WITH ATTACHED TORQUE COLLAR

(75) Inventors: Peter C. Williams, Cleveland Heights, OH (US); Cal R. Brown, Lyndhurst, OH (US); Mark A. Clason, Orwell, OH (US); Dale C. Arstein, Highland Heights, OH (US)

(73) Assignee: Swagelok Company, Solon, OH (US)

( * ) Notice: Subject to any disclaimer, the term of this patent is extended or adjusted under 35 U.S.C. 154(b) by 1359 days.

(21) Appl. No.: 13/266,187

(22) PCT Filed: May 6, 2010

(86) PCT No.: PCT/US2010/033851
§ 371 (c)(1),
(2), (4) Date: Oct. 25, 2011

(87) PCT Pub. No.: WO2010/129756
PCT Pub. Date: Nov. 11, 2010

(65) Prior Publication Data
US 2012/0043757 A1 Feb. 23, 2012

Related U.S. Application Data

(63) Continuation-in-part of application No. 12/709,084, filed on Feb. 19, 2010, now Pat. No. 9,297,481.

(60) Provisional application No. 61/154,144, filed on Feb. 20, 2009, provisional application No. 61/176,622, filed on May 8, 2009, provisional application No. 61/229,773, filed on Jul. 30, 2009.

(51) Int. Cl.
*F16L 19/08* (2006.01)
*F16L 19/10* (2006.01)
*F16L 19/04* (2006.01)

(52) U.S. Cl.
CPC .............. *F16L 19/103* (2013.01); *F16L 19/08* (2013.01); *F16L 19/10* (2013.01); *F16L 19/045* (2013.01); *F16L 2201/10* (2013.01); *Y10T 137/0447* (2015.04)

(58) Field of Classification Search
CPC ... Y10T 29/49428; F16L 19/08; F16L 19/10; F16L 19/045
See application file for complete search history.

(56) References Cited

U.S. PATENT DOCUMENTS 3,139,293 A * 6/1964 Franck .................... F16L 19/14
285/242
4,993,755 A 2/1991 Johnston
(Continued)

FOREIGN PATENT DOCUMENTS

WO 2006/031578 3/2006
WO 2008/057983 5/2008
(Continued)

OTHER PUBLICATIONS

International Search Report and Written Opinion from PCT/US10/33851 dated Jul. 7, 2010.

*Primary Examiner* — Jermie Cozart
(74) *Attorney, Agent, or Firm* — Calfee, Halter & Griswold LLP

(57) ABSTRACT

A conduit fitting of the type having first and second threaded fitting components and at least one conduit gripping device, further includes a stroke limiting member that allows the fitting to be pulled up by applying a predetermined torque. In one embodiment, the stroke limiting member may be a non-integral torque collar. Alternatively, the fitting may also be pulled up by turns or may have an integral torque collar. In still another embodiment, a stroke limiting member is provided that may be used to enable a fitting that is designed to be pulled up by turns to also be pulled up by torque. In other embodiments, the non-integral torque collar may be installed onto one of the fitting components, and then deformed so as to prevent or make it more difficult to remove the torque collar after installation onto the fitting component.

10 Claims, 18 Drawing Sheets

(56) References Cited

U.S. PATENT DOCUMENTS 6,629,708 B2 10/2003 Williams et al.
7,695,027 B2 4/2010 Williams et al.
2010/0213705 A1 8/2010 Williams et al.

FOREIGN PATENT DOCUMENTS

| WO | 2009/018079 | 2/2009 |
| WO | 2009/020900 | 2/2009 |
| WO | 2010/129261 | 11/2010 |

\* cited by examiner

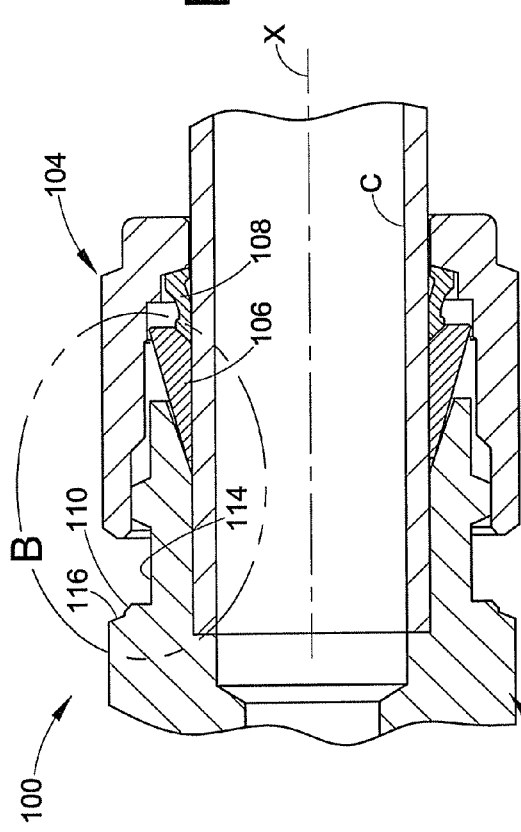
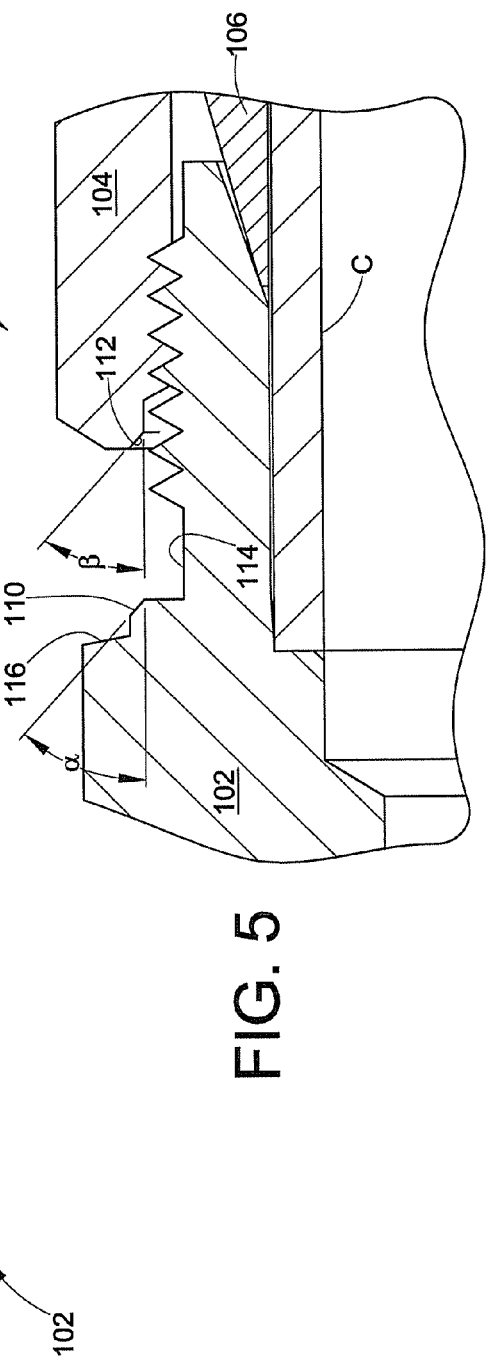

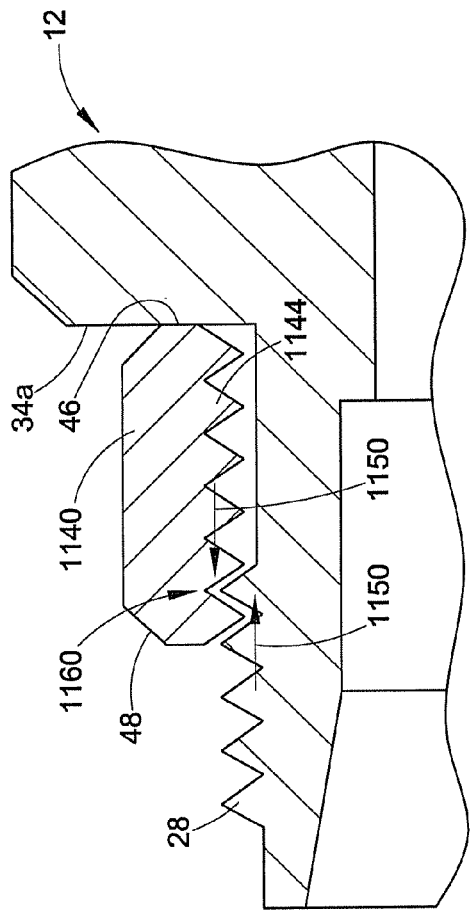
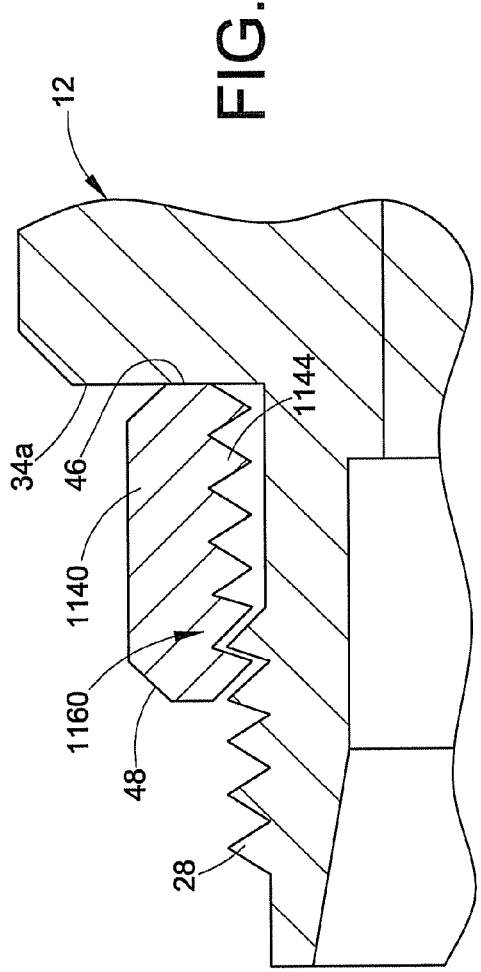

METHOD OF ASSEMBLING CONDUIT FITTING WITH ATTACHED TORQUE COLLAR

CROSS REFERENCE TO RELATED APPLICATIONS

The present application claims the benefit of U.S. provisional patent application Ser. No. 61/176,622 filed on May 8, 2009, for CONDUIT FITTING WITH TORQUE COLLAR, the entire disclosure of which is fully incorporated herein by reference. The present application also claims the benefit of U.S. provisional patent application Ser. No. 61/229,773 filed on Jul. 30, 2009, for CONDUIT FITTING WITH CRIMPED TORQUE COLLAR AND OPTIONAL TAPERED NUT, the entire disclosure of which is fully incorporated herein by reference. The present application is also a continuation-in-part of U.S. patent application Ser. No. 12/709,084 filed on Feb. 19, 2010 for CONDUIT FITTING WITH TORQUE COLLAR, now U.S. Pat. No. 9,297,481 B2 which claims the benefit of U.S. provisional patent application Ser. No. 61/154,144 filed on Feb. 20, 2009, for CONDUIT FITTING WITH TORQUE COLLAR, the entire disclosures of which are fully incorporated herein by reference.

TECHNICAL FIELD OF THE INVENTIONS

The present disclosure relates to fittings for metal conduits such as metal tube and pipe. More particularly, the disclosure relates to fittings that provide conduit grip and seal by tightening together mating threaded fitting components. One example of a fitting is a flareless fitting that uses one or more ferrules to establish conduit grip and seal.

BACKGROUND OF THE DISCLOSURE

Fittings are used in gas or liquid fluid systems to provide a fluid tight mechanical connection between a conduit and another fluid flow device, such as another conduit, a flow control device such as a valve or regulator, a port and so on. A particular type of fitting commonly used is known as a flareless fitting that uses one or more conduit gripping devices such as ferrules, for example, to provide the grip and seal functions. Such fittings are popular as they do not require much preparation of the conduit end, other than squaring off and de-burring.

Other fittings, however, will be of interest for use with the present inventions, including any fitting design that is assembled by tightening together two mating threaded fitting components.

Ferrule type fittings today are pulled up by turns, by tightening the fitting components together a specified number of turns and partial turns past a reference position. By controlling the number of turns, the stroke or axial advance of the fitting components together may be controlled to assure that the ferrules effectively grip and seal the conduit. Oftentimes, such fittings are loosened for various repair and maintenance activities in the fluid system, and then the loosened fitting is re-tightened, referred to commonly as "re-make" or "remaking" the fitting. Such remakes may be done with the same fitting components and ferrules, or sometimes one or more parts are replaced.

SUMMARY OF THE DISCLOSURE

In accordance with an embodiment of one or more of the inventions presented in this disclosure, a torque collar or ring is provided for a conduit fitting that allows the fitting to be pulled up by applying a predetermined torque. In one embodiment, the fitting may also be pulled up by turns. In still another embodiment, a torque collar or ring is provided that may be used to enable a fitting that is designed to be pulled up by turns to also be pulled up by torque.

In accordance with an embodiment of another one or more of the inventions presented in this disclosure, a torque ring or collar for a conduit fitting includes an enlarged flange that allows an assembler or other person to attempt to turn or rotate the torque collar to verify if the fitting has been completely pulled up.

In accordance with another embodiment of one or more of the inventions herein, a stroke limiting feature may be an integral structure formed or provided with external surfaces of one or both of the fitting components.

In accordance with another embodiment of the inventions disclosed herein, pull-up by torque is provided not only for the first pull-up but also for remakes, including alternatively many re-makes, with reliable conduit grip and seal upon each remake. In a more specific embodiment, a nut with internal tapers is provided for centering the ferrules for remake to improve stroke recovery.

In another embodiment, a fitting includes a stroke limiting feature that facilitates pull-up by torque. The pull-up by torque process may further be used for each remake, and the stroke limiting feature facilitates pull-up by torque for many remakes. In a more particular embodiment, each remake may be made to the same predetermined torque as the initial or first pull-up of the fitting. In still a further embodiment, the stroke limiting feature may be realized, for example, using a torque collar. The torque collar may be a non-integral, separate piece of the fitting or may be integrally formed with the fitting components. The torque collar may make contact at the first pull-up, or may not make contact until after one or more remakes.

In another embodiment, pull-up by torque may be further facilitated by optionally using a fitting component having one or more internal tapered surfaces that assist in centering and positioning the one or more conduit gripping devices. The internal tapers benefit not only the initial pull-up by torque but also can significantly increase the number of effective remakes by torque.

In accordance with an embodiment of another one of the inventions presented in this disclosure, a torque ring or collar and/or a fitting body are configured to inhibit removal of a torque collar from the fitting body and/or set the position of the torque collar relative to the fitting body.

In accordance with another embodiment of a torque collar that is configured to inhibit removal of the torque collar from a fitting body after installation, a crimping process may be carried out—with the torque collar threaded or otherwise installed onto the fitting body neck—so as to prevent or make it more difficult for the torque collar to be spun back off or removed from the fitting body. The crimped torque collar may be threaded onto the fitting body, or may be a split collar that can be side or radially loaded onto the neck and then crimped, to name just two of many alternative embodiments.

These and other embodiments of various inventions disclosed herein will be understood by those skilled in the art in view of the accompanying drawings.

BRIEF DESCRIPTION OF THE DRAWINGS

FIG. 4 is another embodiment of a pull-up by torque fitting in a finger-tight position;

FIG. 5 is an enlarged illustration of the portion of FIG. 4 in circle B;

FIG. 17A. is a schematic illustration of a portion of the torque collar and fitting body of the pull up by torque fitting of FIG. 15;

FIG. 17B. is a schematic illustration of a portion of the torque collar and fitting body of FIG. 17A but with the torque collar tightened to deform the threaded engagement;

DESCRIPTION OF THE EXEMPLARY EMBODIMENTS

Figure 1:
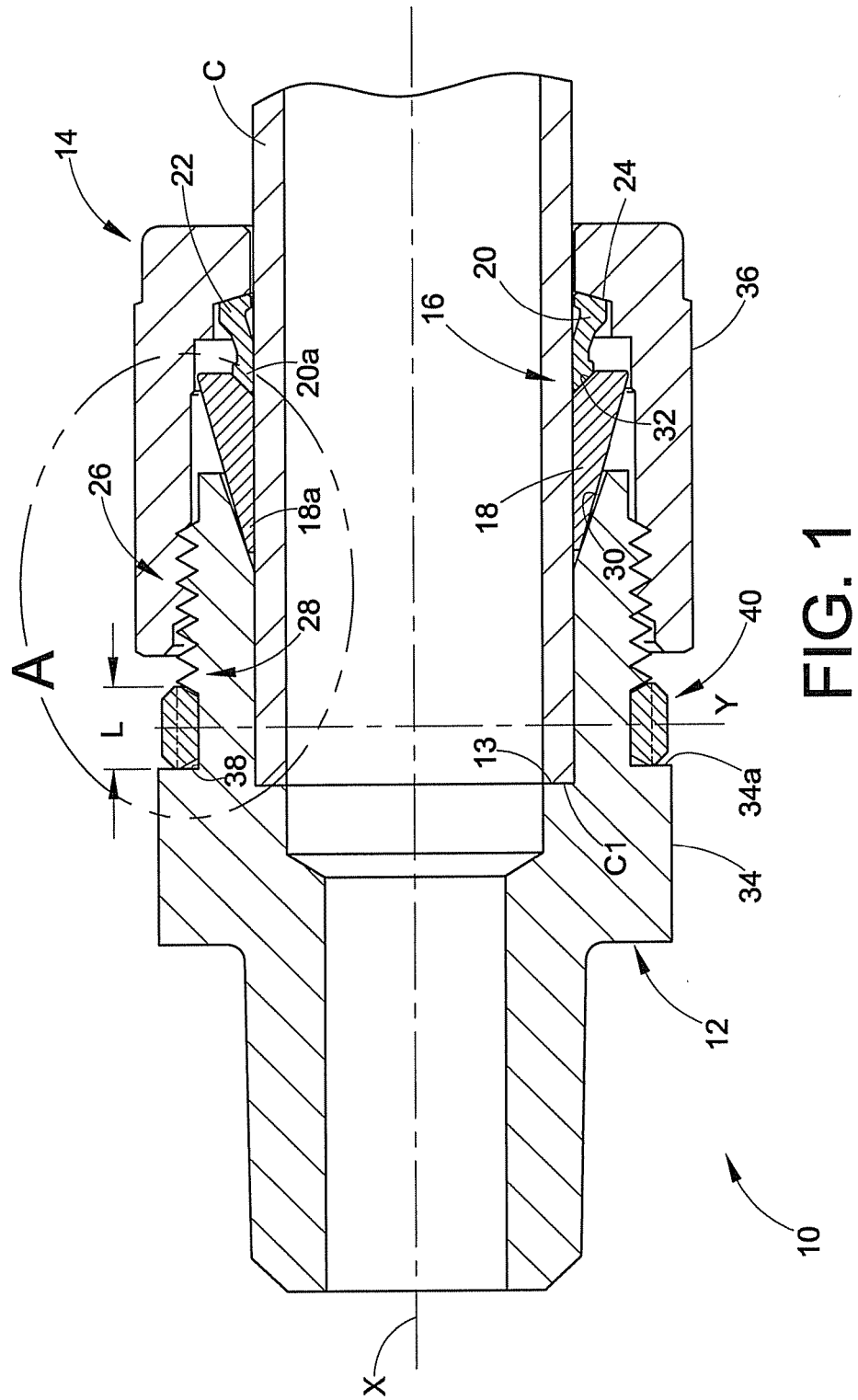
FIG. 1 is an embodiment of a conduit fitting illustrating one embodiment of one or more of the inventions herein, shown in longitudinal cross-section and in a finger tight position.

Although the exemplary embodiments herein are presented in the context of a stainless steel tube fitting, the inventions herein are not limited to such applications, and will find use with many different metal conduits such as tube and pipe as well as different materials other than 316 stainless steel, and may also be used for liquid or gas fluids. Although the inventions herein are illustrated with respect to a particular design of the conduit gripping devices and fitting components, the inventions are not limited to use with such designs, and will find application in many different fitting designs that use one or more conduit gripping devices. In some fittings, in addition to the conduit gripping devices there may be one or more additional parts, for example seals. The inventions may be used with tube or pipe, so we use the term "conduit" to include tube or pipe or both. We generally use the terms "fitting assembly" and "fitting" interchangeably as a shorthand reference to an assembly of typically first and second fitting components along with one or more conduit gripping devices. The concept of a "fitting assembly" thus may include assembly of the parts onto a conduit, either in a finger-tight, partial or complete pull-up position; but the term "fitting assembly" is also intended to include an assembly of parts together without a conduit, for example for shipping or handling, as well as the constituent parts themselves even if not assembled together. Fittings typically include two fitting components that are joined together, and one or more gripping devices, however, the inventions herein may be used with fittings that include additional pieces and parts. For example, a union fitting may include a body and two nuts. We also use the term "fitting remake" and derivative terms herein to refer to a fitting assembly that has been at least once tightened or completely pulled-up, loosened, and then re-tightened to another completely pulled-up position. Remakes may be done with the same fitting assembly parts (e.g. nut, body, ferrules), for example, or may involve the replacement of one of more of the parts of the fitting assembly. Reference herein to "outboard" and "inboard" are for convenience and simply refer to whether a direction is axially towards the center of a fitting (inboard) or away from the center (outboard).

When two threaded parts are tightened together, turns and torque are related factors and applicable to the tightening process. For purposes of this disclosure, however, in the context of pulling up or making up a fitting by tightening together two threaded fitting components (for example, a nut and a body), pull-up "by torque" means tightening the parts together using a prescribed or predetermined torque without requiring a count of the number of relative turns and partial turns. The prescribed or predetermined torque may be a distinct or precise torque value or the prescribed or predetermined torque may be a range of torque values. The predetermined torque may be any range of torque values, depending on the application. In one exemplary embodiment, the predetermined torque is any torque at or above a predetermined torque that ensures that the fitting is properly pulled up to grip and seal the conduit. In another embodiment, the predetermined torque may be a predetermined torque +/−some acceptable tolerance. For example, the prescribed or predetermined torque may be a torque value +/−0 to 15% of a torque value, such as +/−10% of the torque value or +/−15% of the torque value or any range within +/−15% of the torque value. A pull-up "by turns" means tightening the parts together using a prescribed number of relative turns and/or partial turns from a reference position without requiring a prescribed torque. Pull-up by torque and pull-up by turns are used in association with both initial pull-up and remakes as further explained below.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 2:
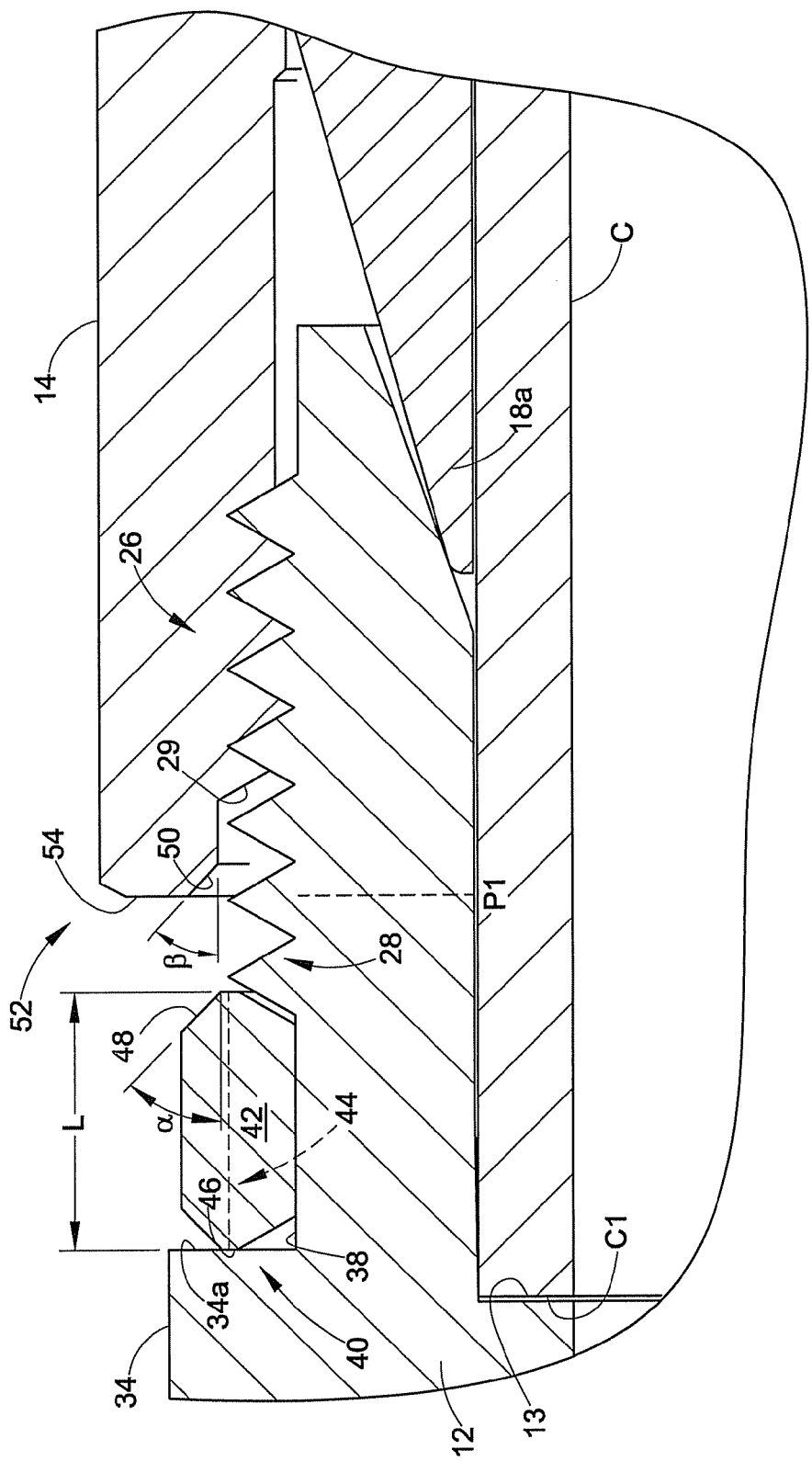
FIG. 2 is an enlarged illustration of the portion of FIG. 1 in circle A.

With reference to FIGS. 1 and 2, a first embodiment of one or more of the inventions is presented. In this example, a conduit fitting 10 for tube or pipe includes a first fitting component 12 and a second fitting component 14. These parts are commonly known in the art as a body and nut respectively, wherein the body 12 receives a conduit end C1, and the nut 14 may be joined to the body 12 during make up of the fitting. Although we use the common terms of body and nut herein as a convenience, those skilled in the art will appreciate that the inventions are not limited to applications wherein such terminology may be used to describe the parts. The body 12 may be a stand-alone component as illustrated or may be integral with or integrated or assembled into another component or assembly such as, for example, a valve, a tank or other flow device or fluid containment device. The body 12 may have many different configurations, for example, a union, a tee, an elbow and so on to name a few that are well known in the art. Fittings are also commonly referred to in the art as male fittings or female fittings, with the distinction being that for a male fitting the male body 12 includes an externally threaded portion and the female nut 14 includes an internally threaded portion. For a female fitting, the male nut 12 includes an externally threaded portion and the female body 14 includes an internally threaded portion. We provide embodiments herein of both male and female fittings.

A typical fitting also includes one or more conduit gripping devices 16. In many fittings these conduit gripping devices 16 are called ferrules. In this disclosure we will use conduit gripping device and ferrule interchangeably, it being understood that a conduit gripping device may alternatively be realized in the form of a component other than what is commonly known or referred to as a ferrule, and may include additional parts such as seals, for example. In this disclosure, the various embodiments for the fittings include two conduit gripping devices, such as for example, a first or front ferrule 18 and a second or back ferrule 20. The distinction between "front" and "back" is for convenience to indicate the direction of axial movement of the conduit gripping devices relative to the body along the central longitudinal axis X. All references herein to "radial" and "axial" are referenced to the X axis except as may otherwise be noted. Also, all references herein to angles are referenced to the X axis except as may otherwise be noted.

As noted, the body 12 is commonly understood as being the fitting component that receives an end C1 of a conduit C. The nut 14 is commonly understood as the fitting component that threadably mates with the body, and includes at least one drive surface 22 that engages a back end or driven surface 24 of the second or back ferrule 20. In FIG. 1, the fitting 10 includes a threaded connection 26 as with external threads 28 on the body 12 and internal threads 29 on the nut 14 (FIG. 2).

It is important to note that the exemplary geometric shapes, configurations and designs of the fitting coupling components 12, 14, and the conduit gripping devices 24, 30 are a matter of design choice and will depend in great measure on the materials used, and the design and performance criteria expected of the fitting. Many different coupling components and conduit gripping device designs are known in the art and may be designed in the future. The present disclosure and the inventions described herein and illustrated in the context of exemplary embodiments are directed to structure and method for providing pull-up by torque or optionally the ability to pull-up by torque or turns.

The term "complete pull-up" as used herein refers to joining the fitting components together so as to cause the one or more conduit gripping devices to deform, usually but not necessarily plastically deform, to create a fluid tight seal and grip of the fitting assembly 10 on the conduit C. A partial pull-up as used herein refers to a partial but sufficient tightening of the male and female fitting components together so as to cause the conduit gripping device or devices to deform so as to be radially compressed against and thus attached to the conduit, but not necessarily having created a fluid tight connection or the required conduit grip that is achieved after a complete pull-up. The term "partial pull-up" thus may also be understood to include what is often referred to in the art as pre-swaging wherein a swaging tool is used to deform the ferrules onto the conduit sufficiently so that the ferrules and the nut are retained on the conduit prior to being mated with the second fitting component to form a fitting assembly. A finger tight position or condition refers to the fitting components and conduit gripping devices being loosely assembled onto the conduit but without any significant tightening of the male and female fitting components together, usually typified by the conduit gripping device or devices not undergoing plastic deformation. We also refer to an initial or first pull-up or make-up to refer to the first time that a fitting is tightened to a complete pulled-up position, meaning that the ferrules and conduit had not been previously deformed. A subsequent pull-up or remake refers to any complete pull-up after a previous pull-up, whether that previous pull-up was the initial pull-up or a later pull-up or remake of the fitting.

The body 12 includes a frusto-conical surface 30 that acts as a camming surface for the front ferrule 18. The back end of the front ferrule 18 includes a frusto-conical recess 32 that acts as a camming surface for the back ferrule 20. In order to effect complete conduit grip and seal, the nut and body are tightened together—commonly known in the art as pull-up or making up or pulling up the fitting and derivative terms—such that the back ferrule 20 and front ferrule 18 axially advance against their respective camming surfaces 32 and 30. This causes a radially inward compression of the ferrules against the outer surface of the conduit C to effect conduit grip and seal. In the exemplary fitting assembly of FIGS. 1 and 2, conduit grip is primarily achieved with the back ferrule, with the front ferrule primarily providing a fluid tight seal. However, in some designs the front ferrule may also grip the conduit and the back ferrule may also provide a fluid tight seal. Thus, the term "conduit gripping device" may include two distinct functions, namely conduit grip and seal, whether or not a specific conduit gripping device perform one or both of those functions. The present inventions may alternatively be used with single conduit gripping device style fittings in which a single conduit gripping device performs both the conduit grip and seal functions, and still further alternatively may be used with fittings that use more than two conduit gripping and sealing devices.

FIG. 1 illustrates the fitting 10 in the finger-tight position. In this position, the ferrules 18, 20 have been installed either before or after the conduit C has been inserted into the body 12, and the nut 14 has been mated with the nut to a point that resistance to turning the nut 14 relative to the body 12 is felt. Preferably, the conduit end C1 bottoms on a counterbore shoulder 13 in the body 12. In this finger-tight position, the nut drive surface 22 is in contact with the back end 24 of the back ferrule and as the nut is spun onto the body, the back ferrule 20 is pushed into contact with the front ferrule 18 and the front ferrule 18 contacts the body camming surface 30. Typically, an assembler will manually tighten the nut 14 onto the body until feeling resistance to further tightening, indicating that the components are generally abutting and in the position illustrated in FIG. 1.

Figure 3:
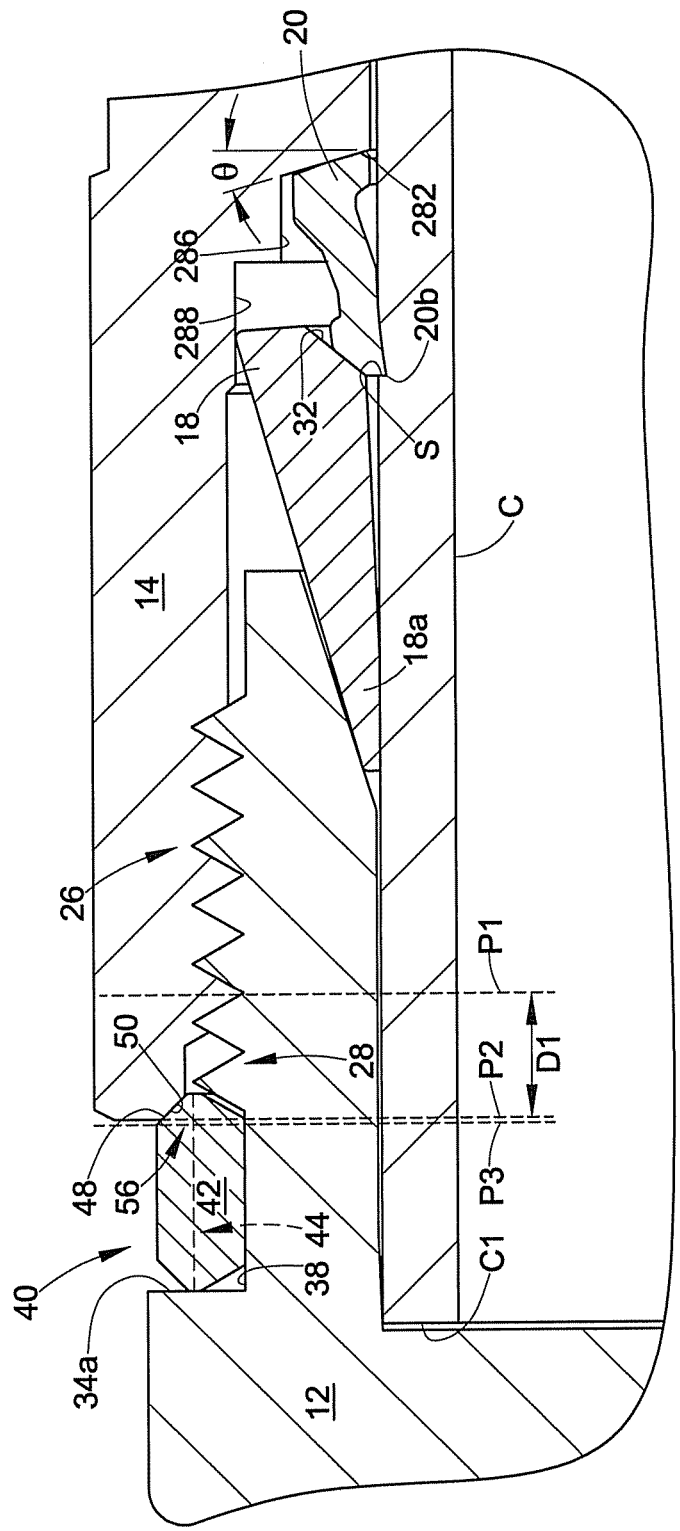
FIG. 3 is an enlarged illustration of the portion of FIG. 1 in circle A but with the fitting in a complete pulled up position.

In order to complete the connection, the body and nut are rotated relative to each other, also known as making up or pulling up the fitting. The drive surface 22 pushes the back ferrule 20 forward which in turn pushes the front ferrule 18 forward in order to force a forward portion 18a of the front ferrule against the camming surface 30. This causes the front ferrule to be radially compressed to form a fluid tight seal with the camming surface 30 and also with the conduit C. A forward portion 20a of the back ferrule is forced against the frusto-conical recess 32 of the front ferrule. This causes the back ferrule 20 to plastically deform and be radially compressed so that the back ferrule tightly engages the conduit. The front edge 20b (see FIG. 3) of the back ferrule bites into the outer surface of the conduit C to form a shoulder S. This shoulder cooperates with the back ferrule 20 to provide excellent conduit grip even under pressure that would otherwise tend to force the conduit out of the body 12. The back ferrule may also make a fluid tight seal with the conduit although its primary function is conduit grip. The connection is completed when the nut 14 has been sufficiently advanced axially relative to the body 12 so that the fitting 10 and conduit end have a fluid tight seal and strong conduit grip against pressure. This position is illustrated in FIG. 3 and is commonly known as the fully made up or pulled up position.

The body is usually provided with wrench flats 34 and the nut is commonly provided with wrench flats 36 (FIG. 1) to aid the assembler in pulling up the fitting 10. Although either fitting component may be rotated, usually an assembler uses a wrench to hold the body 12 stationary while using another wrench to turn the nut 14. Or alternatively, sometimes the body 12 is held in a fixture, and in some designs the body is already installed or integrated with another structure, especially for female fittings.

Male fitting bodies, such as the exemplary body 12, typically have a cylindrical neck portion 38 that is located between the inner end of the body threads 28 and a facing shoulder 34a of the hex flats 34. For female fittings such as exemplified in FIGS. 11 and 12 herein, the male nut may be provided with a neck portion between the threads and facing shoulder, as will be described hereinafter.

Thus far, the basic structure described herein of a nut, a body and one or more conduit gripping devices to achieve conduit seal and grip, is very well known and is common to many fitting designs, including single ferrule and two ferrule fittings. The particular fittings and operation illustrated herein are embodied in tube fittings sold by Swagelok Company, Solon, Ohio and is described in numerous patents, published patent applications and other publicly available literature, see for example U.S. Pat. Nos. 5,882,050 and 6,629,708. The inventions in the present disclosure are suitable for use, however, with many different fitting designs known today or later developed.

The finger-tight position is important to understand because prior fittings, especially tube fittings, have been designed to be pulled up or made up to the final completed position (FIG. 3 for example) by counting a specified number of turns (where "turns" may include and typically does include partial turns) of the nut relative to the body past the finger-tight position. For example, tube fittings such as are illustrated herein are pulled up to a specified condition of one and a quarter turns past the finger-tight position. Tube fittings for other manufacturers may be pulled up to a different number of turns and partial turns. The turns in actual practice correspond to a predetermined or desired relative axial movement of the nut (and a resulting axial movement of the ferrules or conduit gripping devices) and the body, also known as fitting stroke or stroke. For any given fitting design there will be a corresponding minimum stroke needed to assure that the fitting is properly pulled-up past the finger-tight position. With all the fitting parts in intimate contact in the finger-tight position, there will be a minimum amount of relative axial movement of the nut and the body that will allow the front ferrule to seal and the back ferrule to plastically deform properly to effect the desired conduit grip, or alternatively for a single ferrule to achieve grip and seal. This minimum relative axial movement or stroke corresponds to a specified number of turns based on the thread pitch and the specific design features of the various parts, especially the material properties and geometry of the ferrules, as well as the material properties of the conduit. Because turns past finger-tight position readily translate to relative axial movement or stroke, conduit fittings have historically been pulled up by turns.

A proper or effective initial or first pull-up is one by which effective conduit grip and seal are achieved so that the fitting may perform to its specifications as set forth by the fitting manufacturer. Such performance specifications or ratings may include, for example, maximum fluid pressure to assure a fluid-tight leak free connection. We use the terms "effective remake" and "reliable remake" interchangeably herein.

Each component or part of a fitting, including the conduit, will have its own set of tolerances and material characteristics. For example, commercial conduits of a given size will have an outside diameter within an acceptable tolerance or range. The conduit will also have a wall thickness and hardness within specified tolerances. Similarly, machined or formed parts such as the nut, body and ferrules will each have various dimensions and material properties within specified ranges. As a result, across a large population of parts for any given fitting size or design, tolerance stack-up will necessarily occur and will occur randomly but possibly statistically predictable. By tolerance stack-up we mean that any random assembly of fitting parts will have some parts at a maximum tolerance, some at a minimum tolerance, and many if not most near the nominal values. But to assure a proper initial pull-up, the specified number of turns will take into account the possibility that a fitting assembly may randomly contain parts having a tolerance stack-up that is close to or at the tolerance limits, either high or low. Therefore, the specified number of turns past finger-tight position will be chosen to assure adequate stroke to effect conduit grip and seal so that each fitting will perform to its pressure and seal ratings after the initial pull-up.

Another aspect of conduit fittings is the idea of remakes. The fittings illustrated herein and available from Swagelok are capable of numerous effective remakes without any loss in performance. Fittings are used by the hundreds of millions and are commonly found throughout facilities and equipment in gas and liquid containment lines and systems. It is quite common that one or more fittings have to be disassembled after being installed into a particular location. The reasons for having to disassemble a fitting are as varied as the uses for fittings, but typical examples include the need to replace or repair or service a section of conduit, or a mechanically connected part such as a valve, regulator, filter and so on in the fluid line. After a fitting has been disassembled, it is usually easiest and most cost-effective to re-use the same fitting and fitting components, especially the same ferrules, nut and body. Thus, an effective remake or an effectively remade fitting as used herein is one that is effectively re-tightened to establish a mechanically attached connection with a conduit using the same or in some cases one or more replaced fitting parts, without adverse affects on fitting performance as to fluid tight seal and grip. In other words, an effective remake as used herein means a remake in which the fitting performance is not compromised or altered from its original performance criteria, specification or rating (for example, will achieve the same pressure rating upon remake within the allowed number of remakes as may be specified by the manufacturer). When we use the term remake in the context of the various embodiments and inventions herein, we are referring to effective remakes.

In order to properly remake a fitting, it usually will be necessary for there to be additional axial displacement of the nut relative to the body beyond the axial position of the just prior make up, whether that just prior make up was the initial make up of the fitting (initial make up meaning the first time a fitting was tightened to a fully made up position) or a prior remake. The additional axial displacement for each remake is needed to re-establish proper seal and grip. This is often accomplished by retightening the fitting to its original pull-up position and then the assembler will snug up the fitting by turning the nut a bit more to reestablish conduit grip and seal. Fittings in general can accommodate a finite number of effective remakes because each remake requires further axial advance of the nut relative to and towards the body. Not all fitting designs are suitable for effective remakes. For example, fittings in which the ferrules are crushed together into full contact without any gaps are not very useful for effective remakes and the seal is not reliable for such remakes. Also, fittings that are initially pulled-up to a positive stop cannot be reliably remade using the same positive stop because the positive stop prevents reliable additional axial movement.

Fittings that are designed to be pulled up by turns have found widespread acceptance and use throughout the world in a wide variety of applications. However, some industries are reluctant to utilize fittings that require pull-up by turns because those industries are more accustomed to assembly of parts by torque. For example, in the automotive industry, parts are commonly assembled to a specified minimum torque, allowing the use of simple torque wrenches and other tools so that an assembler immediately knows that the parts were tightened properly.

Fittings that have been designed to be pulled up by turns typically are not recommended to be pulled up by torque. This is because variations or tolerance stack-up in material properties (for example, conduit outside diameter, wall thickness, hardness properties and so forth, as well as inherent variations, again even within specification, of various dimensions of the nut, body and ferrules) can produce a lack of predictable correspondence between torque and stroke. In other words, as a fitting is pulled up, torque will naturally and gradually increase, but it will be difficult except for the most skilled and experienced assemblers working with the highest quality fittings such as are illustrated herein, to "sense" that enough torque is being applied to correspond with the proper number of turns. Although a torque wrench might be used to try to pull-up a fitting that is specified to be pulled up by turns, in order to assure adequate stroke the torque would likely need to be higher than necessary, thereby potentially at the cost of limiting the number of subsequent remakes. With the fitting industry basically conformed to pull-up by turns, instructing pull-up by torque on such known fittings would not be feasible.

Positive stops may be used to pull-up a fitting to mimic a pull-up by torque because when the positive stop is engaged, the torque needed to continue tightening the fitting components will drastically increase. By positive stop is meant a surface engagement by which further axially advance is for all practical purposes prevented, short of severely overtightening the fitting parts. Use of a positive stop is not a true pull-up by torque, but rather the positive stop is simply restricting the ability to further axially advance the nut relative to the body. Therefore, remakes with positive stops are not reliable due to the inability to provide further axial advancement of the ferrules to achieve grip and seal. And, furthermore, use of positive stops do not allow for effective subsequent pull-up or remake by torque.

The following embodiments of the inventions disclosed herein relate to providing a fitting for conduits that may be pulled up by torque or optionally by turns. There are a number of different aspects to this concept. The exemplary embodiments herein disclose apparatus and methods for a fitting that may be pulled up by turns, by torque or both. Advantageously, although not required, the fittings may be initially pulled up by torque or turns and undergo numerous remakes by torque or by turns. Still further, these remakes may each be accomplished with the same torque value or range of predetermined torque values as the initial make up or prior remakes. As still another important aspect, apparatus and methods are provided by which a fitting that is designed to be pulled up by turns may be adapted as taught herein to alternatively be pulled up by torque.

Our concept of a fitting that can be pulled-up by torque, or alternatively that can be pulled-up by torque or turns, may be realized by incorporating a stroke limiting feature. The stroke limiting feature not only allows pull-up by torque, but also facilitates remake by torque, and quite surprising, many remakes by torque.

At first consideration, the view to those of ordinary skill might be that any fitting can be pulled-up by torque, and this is somewhat accurate as to the initial pull-up past the finger-tight position. The challenges to successfully achieve this result, however, would lead away from using pull-up by torque. In order to overcome the inherent tolerance stack-up and various torque inducing factors such as friction, one would have to select a torque value that would be high enough to assure the proper stroke to effect conduit grip and seal, especially for a fitting at the high tolerance end. For example, for a fitting in which the conduit hardness, wall thickness and/or outer diameter are near the maximum allowed tolerance stack-up, significantly more torque will be needed to assure the proper stroke is reached, than for a conduit at nominal or the low end of the tolerance stack-up.

But, this high torque value for initial pull-up, akin to a worst case scenario type of analysis, would result in over-tightening and using too much stroke for fittings where the conduit properties are randomly nominal or at the low tolerance stack-up. This wasted stroke will adversely and even severely impact the number of available remakes, because any fitting will have a finite number of possible remakes based on the amount of available additional stroke. And even though a positive stop may be used to limit stroke on the initial pull-up, the positive stop also prevents additional stroke during remake, so that remakes with positive stops do not reliably re-seal the conduit. Our pull-up by torque concept also facilitates remake by torque, and optionally remake to the same torque as used for the initial make-up or prior remakes. This cannot be done with a positive stop used for an initial pull-up by torque. Moreover, suppose for remakes the positive stop (such as a stop collar for example) is removed. The subsequent remakes now would have no limit on stroke, and again the high torque used for initial pull-up would consume stroke on remake, thereby again limiting the number of reliable remakes.

Therefore, unlike what might be achievable in the prior art with unreliable remakes, our pull-up by torque concepts facilitate initial make-up by torque, and also allow the end user the option to not only remake reliably once or twice, but many times if so desired.

Using our teachings herein, a fitting designer may select a predetermined torque that will achieve a leak-tight initial pull-up within whatever confidence level the manufacturer desires. Some manufacturers may want the predetermined torque to give a leak-free initial pull-up every time, others may want ninety-seven percent reliability, others maybe even less, to give some examples. Even if the predetermined torque does not produce 100% leak-free initial pull-up, the assembler can still further snug up the fitting a bit more if needed, while still allowing for a large number of remakes by torque.

Our pull-up by torque concept, with the option of multiple reliable remakes, also arises from our understanding and teaching herein that the stroke consumed for the initial pull-up is typically going to be the highest pull-up stroke. In other words, substantial stroke is typically needed to assure proper deformation of the ferrules and conduit to achieve proper grip and seal at the initial pull-up. But we have learned that for successive remakes, each remake generally requires less additional stroke than the initial pull-up. For example, remakes may only utilize additional relative stroke in the range of about 0.1 thousandths to about 10 thousandths of an inch. Even more noteworthy is that each successive remake generally takes up less stroke than the prior remakes, even to the point that at a high number of remakes, for example, twenty or more and even more than fifty remakes, the amount of additional stroke needed for successful remake becomes so small as to be nearly immeasurable. But, an important point is that no matter how small the additional stroke might be, some additional stroke is needed to assure a proper effective seal on remake. So over the course of a number of remakes, the additional relative axial stroke required for an effective remake gets less and less, in the nature of an asymptotic curve to nearly but not quite zero inches. While each fitting design is unique in terms of how much stroke may be needed for successful remakes, there generally will be an identifiable transition between the higher amount of stroke needed for the initial pull-up and for a low number of early remakes (perhaps the first two or three remakes, for example), and the lower and somewhat narrowly changing amount of stroke needed for the later remakes. This transition presents an optional opportunity to optimize the stroke limiting feature to initially engage after the larger stroke pull-ups (e.g. the initial pull-up and a few of the early remakes) have been performed, so that the stroke limiting feature may thereafter be used to tightly control the additional relative axial stroke for the later remakes.

The realization that successive remakes require less and less stroke for effective re-seal can be understood from an appreciation that each remake plastically deforms the ferrules a bit more and the conduit also, so that the ferrules can remain or return to their just prior position more predictably with little or no wasted stroke. Thus, less and less stroke and torque are consumed to first get the ferrule back in position before re-torquing to remake the fitting properly.

Therefore, with our teachings, the predetermined torque may be selected to produce a reliable initial pull-up for any tolerance stack-up as desired. We then provide a stroke limiting feature that is first engaged either at the initial pull-up or after one or more remakes, so as to limit the stroke used during remakes. We have found quite surprisingly that this facilitates many remakes even to the same predetermined torque value if so desired, even as many as fifty or more reliable remakes. The initial pull-up by torque may be selected so as to use the stroke needed to effect proper grip and seal, and optionally up to an optimized stroke beyond which successful reliable remakes can be achieved with small incremental axial advance, as controlled then by the stroke limiting feature.

To further emphasize, the stroke limiting feature may but need not, engage during the initial pull-up by torque. Optionally, the stroke limiting feature may not engage until the first or a subsequent remake. The stroke limiting feature optionally may be designed so that stroke is consumed up to an approximate point where each successive remake only requires small incremental additional axial stroke, at which point the stroke limiting feature may engage to control such incremental additional stroke for remakes. The stroke limiting feature thus in effect isolates what would possibly otherwise be an unnecessarily high torque that wastes stroke that could otherwise have been used for remakes.

For example, for a given one and a quarter turns fitting design population, assume 15 N-m (Newton meters) is a predetermined torque for initial pull-up a fitting having a high tolerance stack-up. That same 15 N-m torque will also pull-up a fitting at the low end of the tolerance stack-up, but would result in more than one and a quarter turns, maybe even two full turns or more. The torque limiting feature may be axially positioned so as to engage before such excessive stroke is consumed, and thus may but need not engage during the initial pull-up. For fittings near nominal or on the higher side of the tolerance stack-up, however, the torque limiting feature might not engage until the first, second or possibly even later remake. The torque limiting feature has thus permitted pull-up by torque to a predetermined torque for a fitting design population, while at the same time preventing over-tightening for low end tolerance stack-up assemblies, thereby facilitating many reliable remakes. The stroke limiting feature also provides a stroke controlled pull-up for each remake by torque, which also contributes to allowing many reliable remakes by torque.

Not all fittings from manufacturers will have similar torque to stroke characteristics. Some manufacturers may have looser tolerances on dimensions and material properties, while others may have very tight controls. Some fittings may be designed with torque reducing features such as the use of lubricants, or some fittings may be designed with softer materials for lower pressure applications. But regardless of the multitude of choices made for a fitting design, a predetermined torque may be selected to assure the proper stroke to achieve conduit grip and seal. This predetermined torque may optionally be set high enough that the stroke limiting feature will engage on every pull-up including the initial pull-up and remakes. Once engaged, whether first at the initial pull-up or a later remake, the stroke limiting feature will allow control of the additional axial movement or stroke for each remake, thus maximizing the available number of remakes for a particular fitting design.

With reference to FIGS. 1-3, in one embodiment, a stroke limiting member 40, which may be realized in the form of a torque collar 40, may be included with the fitting 10 to facilitate pull-up by torque. The torque collar 40 may be realized for example, in the form of a non-integral annular ring-like body 42. The body 42 may optionally include internal threads 44 (represented by a dashed line) that allow the torque collar 40 to be installed onto the body 12, such as for example, onto the neck 38, by spinning the torque collar 40 over the body threads 28. The body 42 need not be threaded, however, in all applications. Some advantages of the threaded version are that the threads 44 help center and align the torque collar 40 on the neck 38 and also provides strength and support for the torque collar 40 when the torque collar is axially compressed in use.

We note at this point that the torque collar 40 in this embodiment may be designed for use with a fitting that was designed to be pulled up by turns. The torque collar 40 may also be used in a new fitting that is specifically designed for pull-up by torque. An advantage of the torque collar 40 in combination with a pull-up by turns fitting is that the fitting, for example the fitting 10 herein, may be pulled up by turns or alternatively by torque or even both. The torque collar 40 allows for the use of a pull-up by turns fitting so that an end user need not inventory or purchase special fitting parts other than the torque collar itself. For example, even if the initial pull-up is by turns, one or more remakes may be pulled up by torque. And even though an initial pull-up may be by torque, one or more remakes may be pulled up by turns. Moreover, some remakes may be by turns, others by torque.

The stroke limiting member or torque collar 40 concept works in part because of two interrelated effects. First, during a pull-up (whether it be the initial pull-up or a subsequent remake) and after a predetermined amount of axial displacement or stroke of the nut relative to the body, the torque collar 40 will come into contact with the nut 14, and for each remake thereafter establish a controlled axial displacement or stroke of the nut 14 relative to the body 12. This controlled axial stroke may be designed to correspond to the relative axial stroke between the nut and body to assure, preferably without unnecessary over-tightening, that conduit grip and seal have been effected.

Thus, preferably the torque collar 40 will not contact the nut 14 until the predetermined stroke has occurred to assure that for the initial pull-up, conduit grip and seal has been achieved. The actual predetermined stroke value and the corresponding predetermined torque needed to cause the predetermined stroke to occur will be a function of many different design criteria of the fitting and the reliability that is expected. The torque collar 40 may be designed to engage the nut 14 during the initial pull-up to prevent over-tightening and loss of stroke, or may engage the nut only after one or more remakes. The predetermined torque may be selected to assure proper initial pull-up whether the torque collar 40 contacts the nut 14 or not. But after the torque collar 40 engages the nut, then the torque collar 40 will resist but not prevent further stroke so as to control the stroke during each remake by torque, or even for each remake by turns.

We note at this point that fittings pulled-up by turns are typically remade by retightening the fitting so as to return the ferrules to their just prior position (also referred to as stroke recovery) and then giving another partial turn, for example maybe a ⅛ turn, to remake the fitting. The torque collar 40 may be used, if so desired, for remake by torque or turns because the torque collar presents a controlled axial displacement for each remake.

Second, the torque collar 40 will produce a significant and perceptible increase in torque, after the nut 14 has advanced sufficiently to assure that the fitting 10 has been completely pulled up. Thus, the fitting may be pulled up to the predetermined torque because this predetermined torque will correspond to the predetermined stroke needed for proper conduit grip and seal, and optionally without over-tightening. The predetermined torque may be effected with a torque wrench or may be sensed as a distinct and optionally sharp rise in torque needed to further turn the nut 14 relative to the body 12. Stated another way, the assembler may feel or sense a significant increase in resistance of the nut to turning relative to the body 12. There will be a distinct limiting of the stroke of the nut, and the sensed increase in torque that would be needed to try to further advance the nut will be apparent. This distinct rise in torque will be preferably noticeably greater than the predetermined torque that is used to tighten a fitting to its final completed pulled up position, but in any event will be accompanied by a limiting of the nut stroke as torque is applied. The stroke limiting feature preferably will be designed so that the distinct rise in torque will occur coincident with or after the predetermined relative axial stroke has been reached to assure proper pull-up. Therefore, pull-up by torque, for example, using a torque wrench may be used, or pull-up by torque based on the sensory feedback to the assembler of the significant and distinct increase in torque, may be used.

To further elaborate, an installer or fitting assembler for a fitting that is designed to be pulled up by turns will sense increasing torque during pull-up of a fitting because the ferrules are being deformed and radially compressed against the conduit as the nut is turned relative to the body. With the use of the torque collar, the predetermined torque may be applied and then a sharp or noticeable increase in torque will be sensed but without substantial further stroke of the nut beyond the predetermined stroke that is set by the design of the collar. This is because the torque collar will act to significantly increase resistance to additional axial stroke of the nut relative to the body after proper pull-up is reached. It is this interplay between torque and relative stroke of the nut and the body that enables the torque collar 40 to be designed appropriately so that a torque value or range of torque values may be specified to pull-up the fitting and/or remake a fitting with confidence that the proper stroke has occurred to effect conduit grip and seal. By resisting additional relative axial stroke beyond the predetermined axial stroke position, the predetermined axial stroke can closely correspond to the stroke needed to assure that conduit grip and seal is effected, without over-tightening, optionally for both the initial pull-up as well as each remake by torque.

Although it is optional to use the same predetermined torque for remakes as used for the initial pull-up, it can be expected that this will be a great convenience for the end user as only a single torque wrench or torque specification needs to be used. The torque collar 40, or other stroke limiting member, facilitates this benefit by providing a controlled additional axial displacement with each remake at the prescribed applied torque. The additional axial displacement with each remake will depend on many factors, including but not limited to the angles of the engaging surfaces (48, 50), friction values, hardness, yield strength, creep and so on, as well as how many remakes have already been made.

The torque collar 40 further provides for remakes by torque by allowing further tightening of the nut and body to achieve additional axial advance so as to reliably assure grip and seal upon remake. This is realized for not just one or two remakes but for many remakes. We have observed the ability to reliably remake with torque fifty times or more. Such an ability to remake by torque simply cannot be achieved with positive stop designs known heretofore. Still further we have observed that the remakes may optionally be made to the same torque value as the prior pull-up, and that this same torque value may optionally be used for pre-swaging.

This high number of remakes is particularly surprising with high alloy materials such as stainless steel fittings. Such fittings undergo substantial torque and compressive forces for proper pull-up onto hard conduits. While some efforts in the past have been made to provide positive stop collars that allow remakes by using softer materials that can take an additional "set" during remakes, such stop collars are unsuited for large numbers of remakes, for example, five or more, or with high alloy fittings in which the compressive forces against the positive stop collar cause the positive stop collar to yield. The torque collar 40 may thus be designed to withstand high loads so as to provide the desired resistance to additional stroke, while permitting additional stroke for one or many remakes.

Figure 3A:
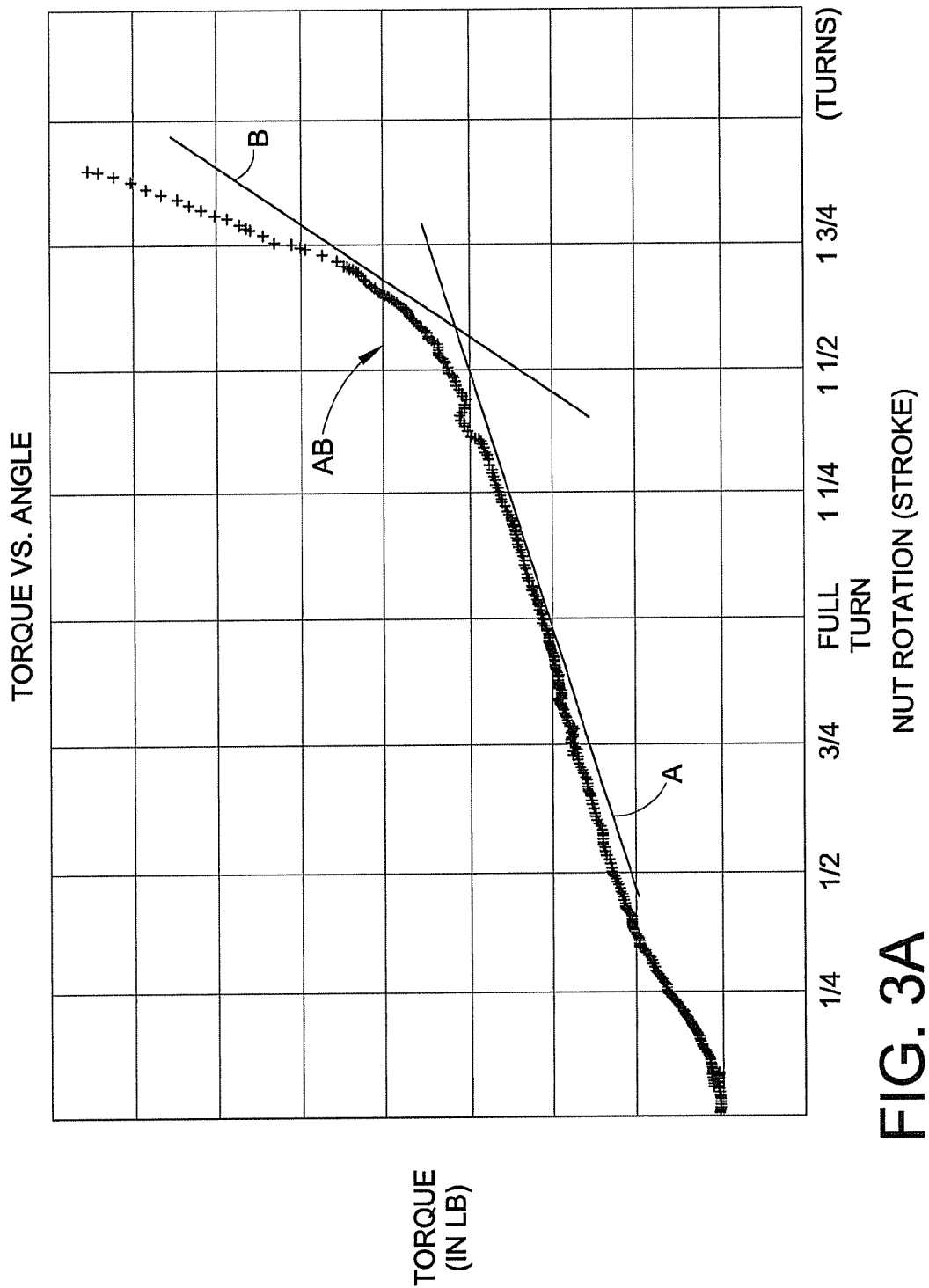
FIG. 3A is a chart illustrating an example of torque versus turns.

With reference to FIG. 3A we illustrate these concepts further with an exemplary chart of torque versus turns of the nut relative to the body (stroke). Actual values for the stroke and torque are not important but rather the concept of the relationship between torque and stroke. Note that for up to a desired or predetermined stroke, the torque gradually increases as represented by slope A. Then the torque rate of increase changes distinctly after the nut has engaged the torque ring, such as represented by slope B. In the transition region AB, the torque collar 40 can be designed to produce a significant resistance (sensed as torque or corresponding to a specified torque such as could be used to enable a torque wrench to be used for pull-up) to additional stroke with a tight correspondence to torque. It is important to recognize that the graph in FIG. 3A is only exemplary and intended to illustrate some of the concepts herein. For example, where the transition region AB occurs relative to the number of turns can be shifted left and right. Also, the amount of torque change and the resistance to further stroke can also be set by the design of the torque collar.

The torque collar 40 preferably is designed so that the predetermined torque for proper pull-up corresponds with a predetermined minimum stroke that allows for tolerance stack up over many fittings. As noted above, all fittings have parts made to specific tolerances, and within a large population of fittings, different fittings will have parts with different dimensions within the allowed tolerances. The torque collar 40 is designed so that given the worst case scenario of tolerance stack-up for a fitting, adequate stroke will be achieved at the predetermined torque or for every torque value in a predetermined range of torques to assure conduit grip and seal. That is, when the pre-determined torque is a range of acceptable torques, the lowest torque of the range assures conduit grip and seal. In other words, the predetermined pull-up torque will correspond with an acceptable range of stroke that assures that the fitting has been properly pulled-up, while allowing for reliable and effective remakes. This is why the torque collar is used to provide a tight correspondence between torque and stroke, not only to prevent over-tightening but also under-tightening of the fitting while still allowing for additional axial displacement (further tightening of the nut and body together) during subsequent remakes. This additional axial movement for remakes may be very small, on the order of 0.1 to ten thousandths of an inch for example, but is sufficient to assure a reliable remake, and is a significant contrast to positive stops that do not reliably allow for such additional axial movement, particularly at the same torque value.

Because the neck 38 has a smaller outer diameter than the inside diameter of the torque collar threads 44, in many cases the torque collar 40 can freely spin on the neck 38 when the fitting 10 is in the finger-tight position.

In the embodiment of FIGS. 1-3, the torque collar 40 may have a planar back face 46 that contacts the nut shoulder 34a. This contact may or may not be present when the fitting 10 in is the finger-tight position. However, because the torque collar 40 controls axial advance or stroke of the nut 14 relative to the body 12, the torque collar 40 preferably will be axially fixed as the fitting 10 is pulled up after the torque collar 40 has engaged the nut 14. In this embodiment, the torque collar 40 may be axially fixed by having the length L such that the back face 46 contacts the body shoulder 34a when the nut 14 comes into contact with the torque collar 40. The back face 46 may have a reduced surface area so as to provide resistance to the torque collar rotating during pull-up. The back face 46 may also be knurled or otherwise formed to resist rotation of the torque collar 40 during pull-up.

Preferably but not necessarily the torque collar 40 is symmetrical about its major axis Y (FIG. 1). This feature allows for simplified assembly in that the torque collar 40 may be installed in either direction onto the neck 38 with the same performance.

The torque collar 40 also includes a wedge surface 48 that contacts a nut taper surface 50 at the open end 52 of the nut 14. The wedge surface 48 may be, for example, a frusto-conical surface although other shapes and profiles may be used as needed. The nut taper surface 50 may also be frusto-conical or any other shape as needed, including but not limited to a sharp or round/radius corner. As viewed in cross-section, the wedge surface 48 may be formed at an angle $\alpha$ relative to the central axis X (FIG. 1) of the torque collar 40. As viewed in cross-section, the nut taper surface 50 may be formed at an angle $\beta$ relative to the central longitudinal axis of the nut, which in the case of most fittings is also the axis X. Any surface of the nut 14 may be used as needed to contact the torque collar wedge surface at the predetermined axial displacement for pull-up. Alternatively, a surface associated with movement of the nut, even an additional part, may be used to contact the wedge surface 48.

As evident from FIGS. 1 and 3, when the fitting 10 is in the finger-tight position, the nut taper surface 50 is axially spaced from the wedge surface 48, and after a completed pull-up, the nut taper surface 50 is axially pressed against the wedge surface 48. We refer to the torque collar surface 48 as a wedge surface because that surface acts to significantly resist axial advance of the nut after the nut taper surface 50 first makes contact with the wedge surface 48, yet will allow additional axial stroke during subsequent remakes. This contact produces a distinct and optionally sharp increase in torque that can be either sensed by the assembler or that will allow a torque wrench to be used to make up the fitting 10. The angles $\alpha$ and $\beta$ may be but need not be the same. We have found that an angle $\alpha$ of about 45 degrees works particularly well, but many different angle values may be used. As the angle $\alpha$ approaches ninety degrees, the torque collar 40 basically acts as a positive stop. While this is acceptable for an initial pull-up, it does not allow for remakes, especially a number of remakes of about ten or more. As the angle $\alpha$ approaches zero, the torque collar 40 will present less and less resistance to axial advancement of the nut 14 relative to the body and therefore might not present a distinct enough limit on the stroke of the nut with increasing torque. However, depending on the material of the torque collar 40 and the surface 48 hardness and friction (similarly for the nut taper surface 50), shallow angles as low as ten degrees may work fine in many applications. The upper bound on the angle $\alpha$ will also depend on the desired number of remakes and the amount of torque increase that is desired, but angle values for $\alpha$ may be as high as seventy-five degrees or more depending on the overall required performance.

The leading edge 54 of the nut taper surface 50 will initially contact the wedge surface 48 as the fitting 10 is pulled up. Further advance of the nut 14 relative to the body 12 will cause the forward portion 56 of the torque collar 40 to enter the frusto-conical recess defined by the nut taper surface 50 with tighter and tighter engagement between the wedge surface 48 and the nut taper surface 50. This will result in a distinct and significant increase in torque compared to the torque increase that would otherwise be noted for the same nut stroke if the torque collar 40 were not present. The torque collar 40 and the nut 14 cooperate during pull-up to produce a distinctly and perceptible increase in torque that is higher than the predetermined torque value that corresponds with the predetermined relative axial stroke for proper make up of the fitting 10 and is accompanied by a significant resistance to additional relative axial stroke of the nut and body. In other words, the torque collar 40 and the nut 14 are designed to produce a distinct torque increase due to the increasing load between the nut 14 and the torque collar 40 when combined with the interaction of the conduit gripping devices and the conduit. As illustrated in FIG. 3, this cooperation between the torque collar 40 and the nut 14 may result in significant surface to surface contact and load between the wedge surface 48 and the nut taper surface 50, but this drawing is only intended to be exemplary. The actual amount of contact for initial pull-up as well as one or more remakes will be determined by overall design criteria for the fitting 10.

As illustrated in FIG. 3, upon complete pull-up, the front ferrule 18 has been radially compressed by the body camming surface 30 to form a fluid-tight seal against the camming surface 30 and against the conduit C. A forward portion of the back ferrule 20 has also been radially compressed so that the back ferrule preferably bites into the conduit C to form the shoulder S. However, the inventions herein may be used with fitting designs in which the back ferrule does not necessarily bite into the conduit.

As noted hereinabove, as the fitting 10 is being pulled up to the completed pull-up position represented in FIG. 3, the torque collar 40 functions to tightly control the relationship between the relative nut and body stroke and the increase in torque. A predetermined torque should correspond to the predetermined stroke of the nut 14 relative to the body 12 to effect proper pull-up and to assure proper conduit grip and seal. Accordingly, the axial position of the torque collar 40 preferably is carefully controlled, and in the exemplary embodiments herein is achieved by contact between the torque collar 40 and the body shoulder 34a. This assures precise axial position of the wedge surface 48 for contact with the nut 14. Performance will be further assured by careful manufacturing process control of the thread pitch (for the nut and body), as well as the axial length L of the torque collar 40, the angles $\alpha$ and $\beta$, and the axial distance between the leading edge 54 that initially contacts the wedge surface 48 and the drive surface 22 that contacts that back ferrule 20. Although in the embodiments herein the initial contact or leading edge 54 happens to also be the forward outer end of the nut 14, this need not be the case in all designs.

Another aspect of the stroke limiting feature is to allow remakes of the fitting 10. This may be accomplished by designing the torque collar 40 to allow further axial advance of the nut 14 relative to the body 12 for fitting remake, relative to the axial position of the nut 14 relative to the body 12 for the just prior pull-up. For example, assume that FIG. 3 represents the initial or first complete pull-up of the fitting 10. The nut 14 has axially advanced from a position P1 when the fitting 10 was in the finger-tight position (FIG. 1) to a position P2 for the fitting 10 in the complete pulled up position. The distance D1 (from P1 to P2) corresponds then to the predetermined axial advance of the nut 14 relative to the body 12 for a complete pull-up. Next assume the fitting 10, having been initially pulled up, is then disassembled. For remake of the fitting 10, the parts are reassembled and the nut 14 typically can be turned to position the nut 14 at P2 because the conduit and ferrules have already been plastically deformed somewhat. This will also mean that the torque collar 40 is in contact with the nut 14, but there likely will be a rather low load between the two. The nut 14 can then be further axially advanced using the predetermined torque for initial pull-up if so desired, until the torque again distinctly increases. For example, the nut 14 may advance to position P3 in order to effect adequate seal and grip (i.e. remake). In FIG. 3 the distance from P2 to P3 is exaggerated for clarity. In practice, each remake typically uses a smaller further axial advance of the nut 14 relative to the body 12. For example, for a quarter inch tube fitting (meaning for example that the nominal conduit outside diameter is about a quarter inch), each remake may require further advance of about 0.1 to about ten thousandths of an inch to properly remake the fitting 10.

In this embodiment then, the wedge surface 48 thus allows for remakes by allowing for further axial advance of the nut 14 relative to the body 12. However, other surface profiles may be used to provide the desired torque increase relative to stroke of the nut while also allowing for one or more remakes. We have found that the angle $\alpha$ of about forty-five degrees can result in twenty-five or more remakes. The torque increase is also a function of the shape of the nut taper surface 50. The designer may choose those shapes and angles that best achieve the desired performance for pull-up by torque and remakes.

Many factors may be used to control the amount of additional axial stroke for each remake. In addition to the angles and profiles of the wedge surface 48 and the nut taper surface 50, additional axial displacement actually occurs due to either radially outward flaring or expansion of the nut 14, radially inward compression of the torque collar 40, plastic deformation such as creep at the engaging surfaces 48, 50, or any combination thereof. These deformations may be controlled, for example, through the hardness of the components, surface finish and so on. The designer therefore has available a number of different factors including others not listed here, to effect controlled axial displacement with each remake, without adversely affecting the performance of the fitting.

The fitting 10 then of FIGS. 1-3 can be pulled up by torque, or alternatively be pulled up by turns, and the various remakes may be by torque or turns or combinations of both. This is particularly advantageous for fittings that have been designed to be pulled up by turns. Without having to change the design of the nut, body or ferrules, a pull-up by turns fitting may be optionally converted to a fitting that may be pulled-up by torque by simply adding the stroke limiting feature. This avoids any need for multiple inventories of nuts and bodies for pull-up by turns and pull-up by torque fittings.

As noted hereinabove, the stroke limiting feature, for example the integral or non-integral torque collar, need not necessarily engage during the initial pull-up, but might only engage after one or more remakes. This is a particularly useful feature for a fitting that the customer wants to have the option of pulling up by turns or by torque. For a fitting that will be pulled up by turns, it may be desirable to size the stroke limiting feature to not engage during the initial pull-up so as to ensure that the prescribed number of turns occurs and results in the predetermined relative stroke between the nut and body to achieve proper conduit grip and seal. But for the same fitting, if pulled up by torque, the predetermined torque may be selected and the stroke limiting feature appropriately sized, so that the stroke limiting feature does engage upon the initial pull-up, or optionally does not engage on the initial pull-up. There is also the option available that for a pull-up by turns, that the stroke limiting feature is designed to engage at the prescribed number of turns; and will also engage at the applied predetermined torque if torque is alternatively selected for initial pull-up.

Many factors will influence the final design, including but not limited to the hardness of the torque collar 40, surface characteristics of the wedge surface 48 and the nut taper surface 50 to effect desired friction between the torque collar 40 and the nut 14, and the angles $\alpha$ and $\beta$. As general criteria, for fittings that will be used with high strength alloy metal conduits such as stainless steel, the body and nut are commonly also made of stainless steel. The torque collar 40 will therefore need to be able to withstand the rather substantial loads that will be incurred as the fitting 10 is pulled up. A torque collar 40 may then typically be made of stainless steel as well, and in some cases hardened stainless steel, so as to provide low creep with a desired amount of friction when in contact with the nut 14. The torque collar 40 should be able to withstand the loads applied to it when the fitting 10 has been fully assembled, and also have a high yield strength in order to be able to withstand remakes of the fitting 10. But, the torque collar 40 must also provide for allowing further axial advance of the nut relative to the body should remakes by torque be desired. Of course, the strength of the torque collar and its material characteristics will depend on the performance criteria of the fitting 10 itself and the nature of the materials of the fitting parts and the conduit.

Because the torque collar 40 allows for one or more remakes, the wedge surface 48 may be thought of as a dynamic wedge in that the torque collar permits controlled additional relative axial advance or stroke of the nut and body for each remake, meaning that the contact position of the nut taper surface 50 against the wedge surface 48 will change, even ever so slightly, with each remake. The torque collar 40 therefore will preferably characterized by a high yield strength but may yield somewhat, to facilitate many remakes when such is a desired performance characteristic of the fitting 10.

Successful remakes using a torque collar, whether formed integral or as a discrete part, as set forth herein may be attributable to other factors than just the angle of the wedge and tapered surfaces, friction, creep and so forth. Depending on the design of the engaging surfaces, there may also be radial expansion of the nut, or radial compression of the torque collar, to name two examples. The important aspect is that the engaging surfaces and the fitting components such as the nut and body, interact or cooperate so as to assure that for each desired remake, controlled additional axial displacement is achieved so as to effectively remake the fitting using torque. This will usually, although not necessarily, be accompanied by a plastic deformation or set with each pull-up, so that during remake, the parts are retightened to their just prior position and then tightened a bit more, optionally to the same predetermined torque used for the just prior pull-up, for the additional axial displacement. Each remake is effective based on the assessment that proper conduit grip and seal are reestablished, so that with each remake the fitting will continue to perform to its specified ratings, such as pressure and leakage related ratings.

We have found that the dynamic wedge concept optionally facilitates another inventive aspect. Not only may the fitting 10 be initially pulled up by torque, and remade by torque, but significantly and quite unexpectedly the fitting 10 may be initially pulled up and remade multiple times to the same torque value. We have achieved this even if the fitting is pulled up one or more times by turns. This aspect has tremendous advantages for low cost implementation in that assemblers need only have a single torque wrench or other tool to pull-up the fitting 10. We have been able to remake such fittings more than fifty or even a hundred times in some designs, including to the same predetermined torque. Alternatively, the applied torque used for remakes may be different than the predetermined torque for initial pull-up. For example, each successive pull-up may use a somewhat higher applied torque.

We have also found that when the predetermined torque is a range of torque values, not only may the fitting 10 be initially pulled up by applying any of the torque values in the range, and remade by torque, but significantly and quite unexpectedly the fitting 10 may be initially pulled up and remade multiple times by any of the torque values in the range. For example, the fitting 10 may be initially pulled up by applying a torque value that is relatively high in the predetermined acceptable torque range. Then, the fitting 10 may be remade one or more times by applying any torque value in the predetermined torque range, including torque values that are lower than the torque value applied to initially pull up the fitting. Each remake may be made by applying any torque value in the torque range. Like the initial pull up and remake, a subsequent remake may be made by applying a torque value in the predetermined torque range that is lower than a torque value applied to achieve an earlier remake. We have achieved this even if the fitting is pulled up one or more times by turns. This aspect has tremendous advantages, as it allows for tolerances in torque application tools, such as torque wrenches used by assemblers.

As is noted above, predetermined torque may be a range of torque values. The predetermined torque may be any range of torque values, depending on the application. In one exemplary embodiment, the predetermined torque is any torque at or above a predetermined torque that ensures that the fitting is properly pulled up to grip and seal the conduit. In another embodiment, the predetermined torque may be a predetermined torque +/−some acceptable tolerance. For example, the prescribed or predetermined torque may be a torque value +/−0 to 15% of the torque value, such as +/−10% of the torque value or +/−15% of the torque value or any range within +/−15% of the torque value. The prescribed or predetermined torque may be a distinct or precise torque value or the prescribed or predetermined torque may be a range of torque values. For example, the prescribed or predetermined torque may be a torque value +/−0 to 15% of the torque value, such as +/−10% of the torque value or +/−15% of the torque value or any range within +/−15% of the torque value.

It will be noted from FIGS. 1-3 that the outside diameter of the torque collar 40 is preferably, although not necessarily, less than the outside diameter of the body hex flats 34. This helps assure that the torque collar 40 will not interfere with the use of a wrench or fixture for holding the body 12 during assembly and tightening.

Figure 6:
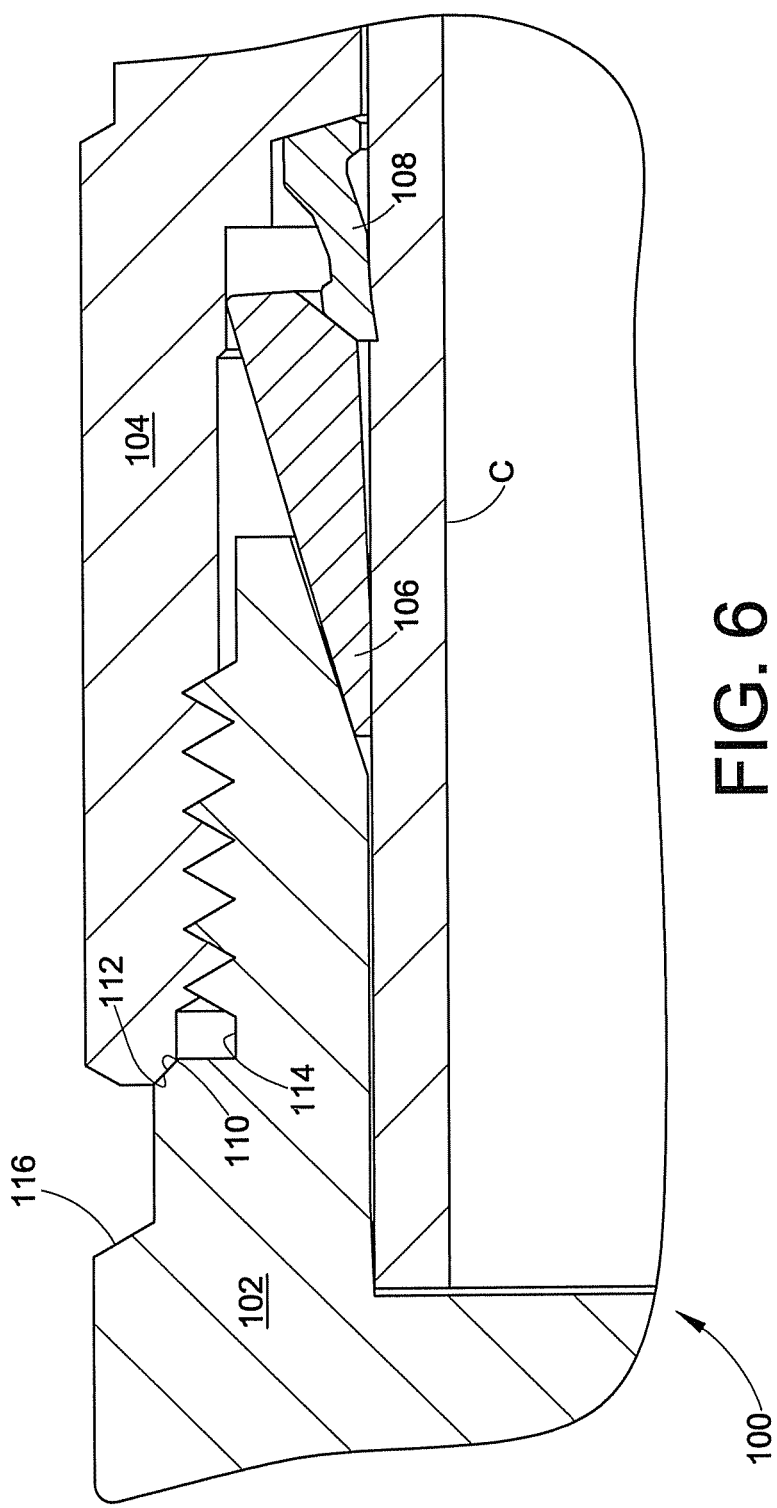
FIG. 6 is an enlarged illustration of the portion of FIG. 4 in circle B but with the fitting in a complete pulled up position.

With reference to FIGS. 4-6, we show an alternative embodiment of the fitting that may be pulled up by torque, by turns or a combination thereof, including initial pull-up and one or more remakes. In this example, the fitting 100 includes a number of parts that may be the same as the embodiment of FIG. 1. In particular there is a body 102, a nut 104 and two conduit gripping devices in the form of ferrules 106, 108 in this case. These parts may be designed and function the same as the earlier embodiment, except that the body 102 has a stroke limiting feature, in the form of an integral wedge surface 110 that may conveniently and optionally be machined or otherwise as part of the machining of the body 102 and thus may be thought of as being an integral torque collar. The wedge surface 110 is angled and designed to perform the same way as the wedge surface 48 of the non-integral torque collar 40 in the above embodiment. The nut 104 also include a nut taper surface 112 that may be angled and designed in a similar manner to the embodiment of FIGS. 1-3. Alternatively, any surface of the nut 14 may be used to engage the integral wedge surface 110. As illustrated in FIG. 6, the wedge surface 110 and the nut taper surface 112 engage during pull-up in a similar manner to the non-integral torque collar 40 embodiment, to provide a distinct and optionally sharp increase in pull-up torque when the proper nut stroke has been reached. The wedge surface 110 provides for remakes as in the above embodiment, and the initial pull-up and one or more remakes may be completed with the same predetermined torque. The fitting 100 may also be pulled up by turns.

An advantage of the embodiment of FIG. 4-6 is that a separate torque collar 40 is not needed, but rather the stroke limiting feature is integral with the body design. This embodiment may be useful, for example, for high volume users that do not want to include a separate part, but can use high volume purchasing to achieve economy of scale.

It is important to note that use of an integral or non-integral torque collar is only one way to realize the stroke limiting feature that also allows remakes. Those skilled in the art may devise other structures to accomplish these effects.

The wedge surface 110 in this embodiment is illustrated as formed into the body 102 hex area that in the FIG. 1 embodiment provides the body shoulder 34a (FIG. 2). The wedge surface 110 may alternatively be positioned elsewhere, for example as part of the neck 114. Note that the body shoulder 116 may be raked back as needed to accommodate a longer nut.

Figure 7:
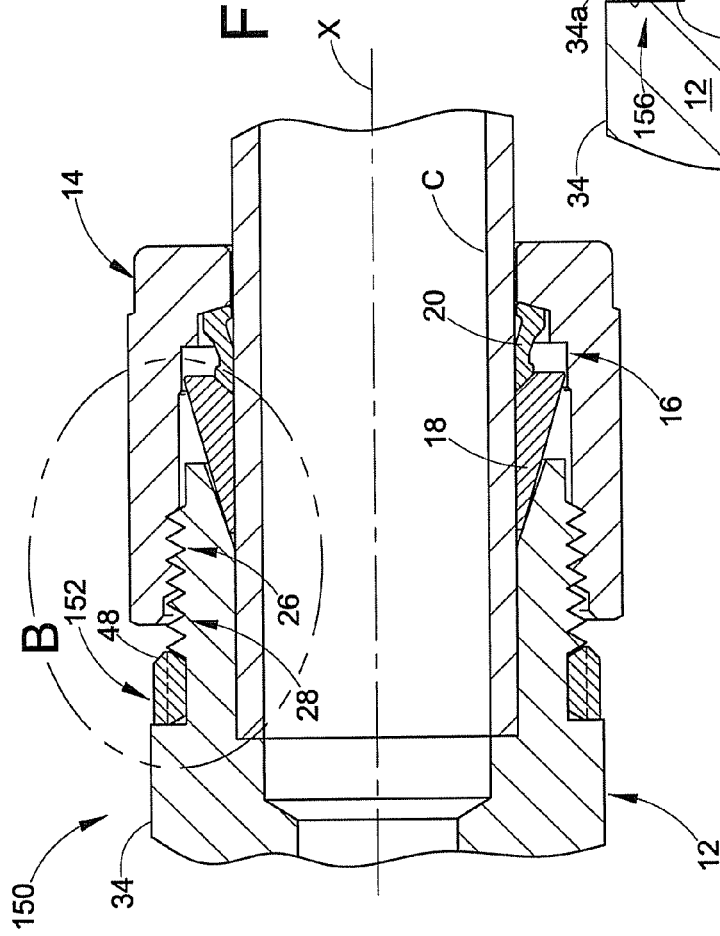
FIG. 7 is another embodiment of a pull-up by torque fitting in a finger-tight position.
Figure 8:
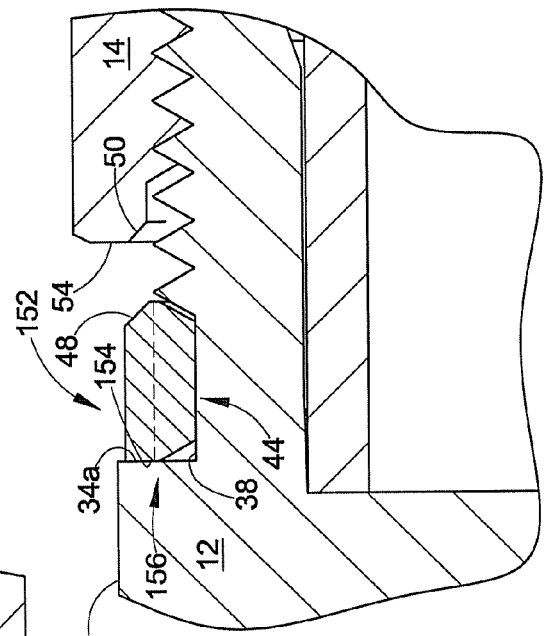
FIG. 8 is an enlarged illustration of the portion of FIG. 7 in circle B.

With reference to FIGS. 7 and 8, in this embodiment all parts of the fitting 150 may be the same and function the same as the embodiment of FIGS. 1-3 (and are given like reference numerals), with the notable exception that in this embodiment the torque collar 152 is not a symmetrical body. Rather, the forward part of the torque collar 152 may include the wedge surface 48, and the torque collar 152 will cooperate with the nut taper surface 50 to provide the same performance features described hereinabove with respect to FIGS. 1-3. The torque collar 152, however, may be provided with a radially extending annular surface 154 that contacts the body shoulder 34a during pull-up. By omitting the mirror image tapered surface, the torque collar 152 provides more bulk material at the high load area 156, which can help stabilize the torque collar for high load applications and increase the contact area between the annular surface 154 and the body shoulder 34a.

Figure 9:
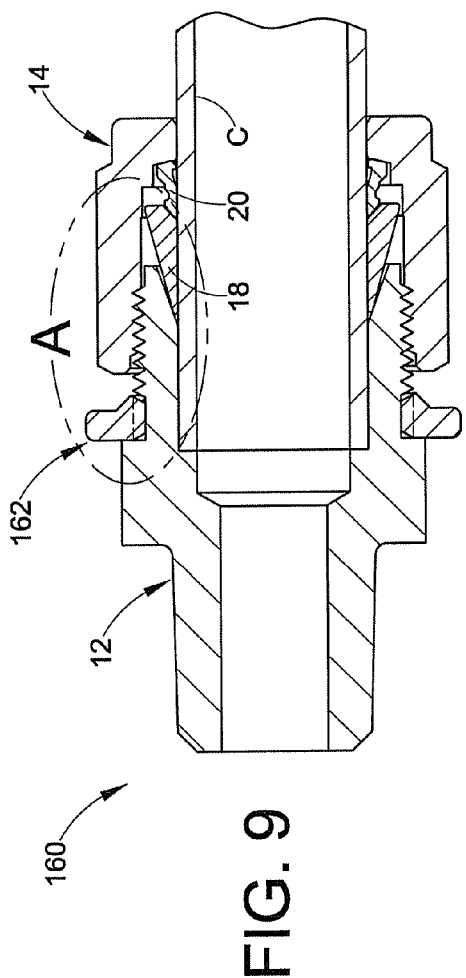
FIG. 9 is another embodiment of a pull-up by torque fitting, assembled on a conduit end in a finger-tight position.
Figure 10:
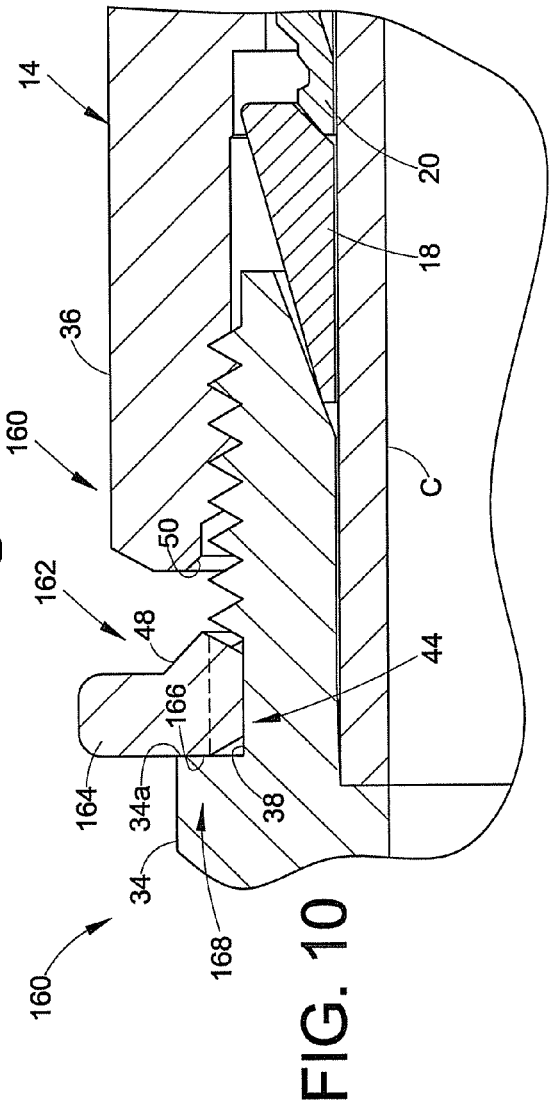
FIG. 10 is an enlarged illustration of the portion of FIG. 9 in circle A.

With reference to FIGS. 9 and 10, in this embodiment all parts of the fitting 160 may be the same and function the same as the embodiment of FIGS. 1-3 and 7 and 8 (and are given like reference numerals), with the notable exception that in this embodiment the torque collar 162 is not a symmetrical body, and also is provided with a radially extending annular flange 164. As in the embodiment of FIGS. 7 and 8, the forward part of the torque collar 162 may include the wedge surface 48, and the torque collar 162 will cooperate with the nut taper surface 50 to provide the same performance features described hereinabove with respect to FIGS. 1-3 and 7-8. The torque collar 162, however, may be provided with a radially extending annular surface 166 that contacts the body shoulder 34a during pull-up. By omitting the mirror image tapered surface, the torque collar 162 provides even more bulk material at the high load area 168, which can help stabilize the torque collar for high load applications and increase the contact area between the annular surface 166 and the body shoulder 34a.

The radial flange 164 in this example extends outward beyond the nut hex flats 36 and the body hex flats 34. Because the torque collar 162 is axially compressed against the body 12 after a complete pull-up, the assembler or an inspector may try to spin or rotate the torque collar 162. If the torque collar 162 can be rotated, then the fitting 160 has not been fully tightened and pulled up. The outer periphery of the flange 164 may be knurled or otherwise treated to assist in applying force to the torque collar 162 to try to rotate it about the neck 38.

Those skilled in the art will appreciate that, as noted hereinabove, in some cases the stroke limiting feature need not necessarily engage during an initial pull-up or even for one or more subsequent remakes. In these cases, the torque collar may still be free to rotate or to be spun even after a complete pull-up. But for designs in which the stroke limiting feature engages even for the initial pull-up, the ability or inability to spin or turn the torque collar may be used to gauge whether the fitting has been properly tightened.

Figure 11:
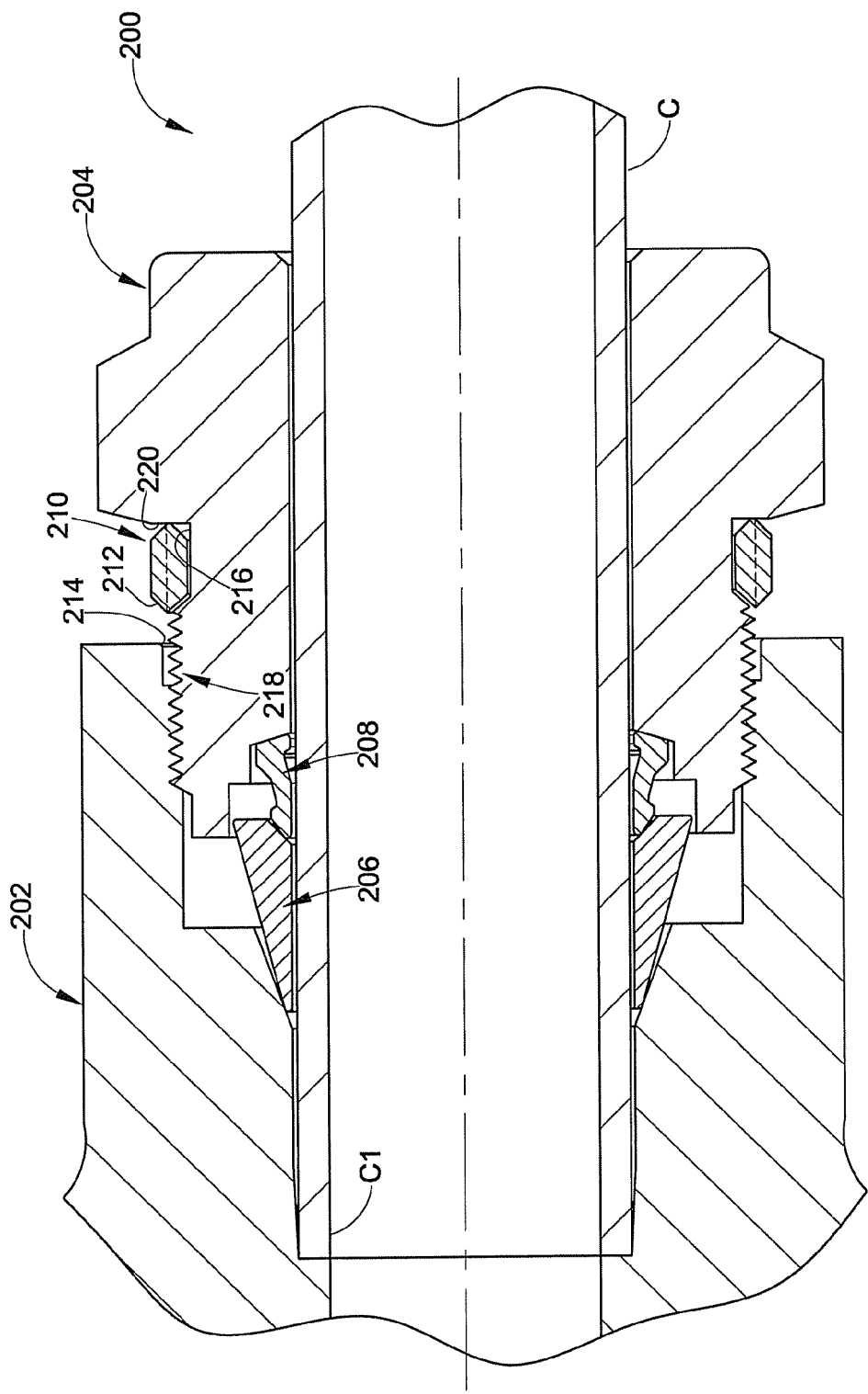
FIG. 11 is another embodiment of a pull-up by torque female fitting, assembled on a conduit end in a finger-tight position with a non-integral torque collar.

With reference to FIG. 11 we illustrate another embodiment. In this embodiment, a fitting assembly 200 is realized in the form of a female fitting, thus having a female threaded body 202 and a male threaded nut 204. First and second ferrules 206 and 208 are also provided although a single ferrule may alternatively be used for other fitting designs, and may be but need not be the same as the ferrules noted in the above-identified patents. The fitting assembly 200 may be pulled-up by turns if so desired. Alternatively, a torque collar 210 may be used to provide pull-up by torque and remakes, in a manner similar to the above-described embodiments. The torque collar 210 presents a wedge surface 212 that engages a tapered surface 214 of the body 202. The tapered surface 214 engages the wedge surface 212 to provide a distinct torque increase when the proper axial advance of the nut 204 relative to the body 202 has occurred in response to an applied predetermined torque to achieve a complete pull-up. The torque collar 210 may be conveniently disposed in a neck portion 216 of the male nut, between the male threads 218 and a facing shoulder 220. Operation of the fitting for pull-up by torque may be as described hereinabove with respect to the embodiment of FIG. 1.

Figure 12:
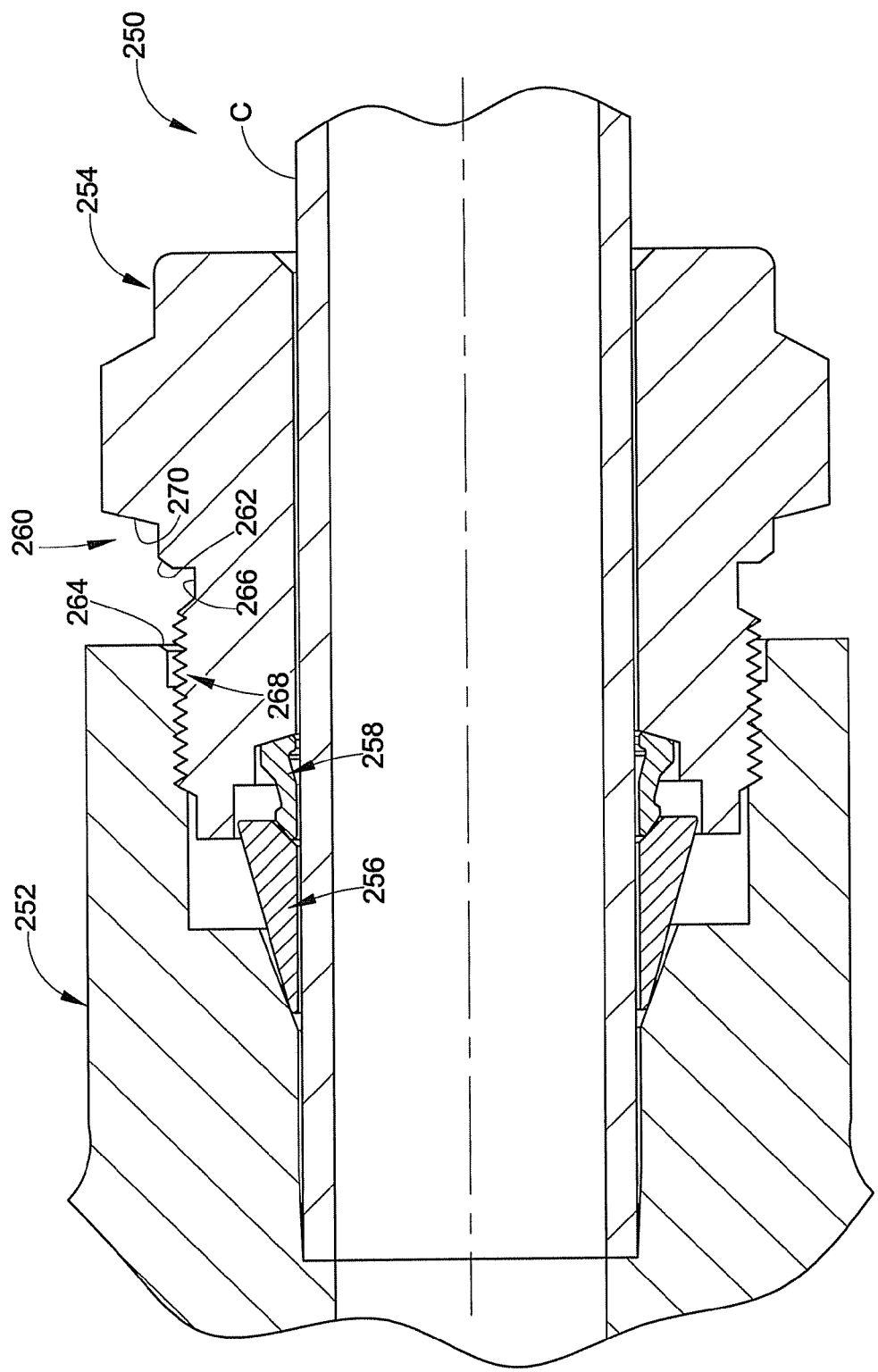
FIG. 12 is another embodiment of a pull-up by torque female fitting, assembled on a conduit end in a finger-tight position, with an integral torque collar.

With reference to FIG. 12 we illustrate another embodiment. In this embodiment, a fitting assembly 250 is realized in the form of a female fitting, thus having a female threaded body 252 and a male threaded nut 254. First and second ferrules 256 and 258 are also provided although a single ferrule may alternatively be used for other fitting designs, and may be but need not be the same as the ferrules noted in the above-identified patents. The fitting assembly 250 may be pulled-up by turns if so desired. Alternatively, an integral torque collar 260 may be used to provide pull-up by torque and remakes, in a manner similar to the above-described embodiment of FIG. 4 for example. The integral torque collar 260 presents a wedge surface 262 that engages a tapered surface 264 of the body 252. The tapered surface 264 engages the wedge surface 262 to provide a predetermined torque when the proper axial advance of the nut 254 relative to the body 252 has occurred to achieve a complete pull-up. The integral torque collar 260 may be conveniently disposed adjacent a neck portion 266 of the male nut, between the male threads 268 and a facing shoulder 270. Operation of the fitting for pull-up by torque may be as described hereinabove with respect to the embodiment of FIG. 4.

Figure 13:
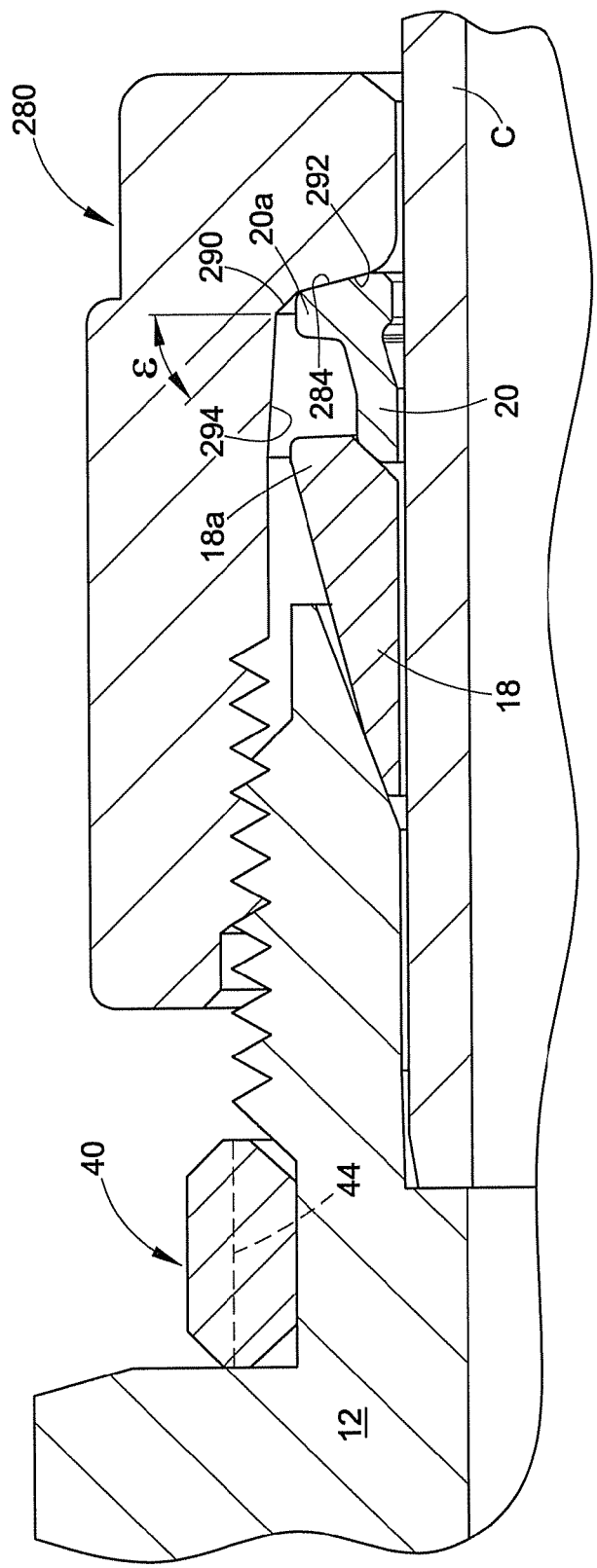
FIG. 13 illustrates another embodiment of a male fitting with a non-integral torque collar, also using internally tapered surfaces of the female nut.
Figure 14:
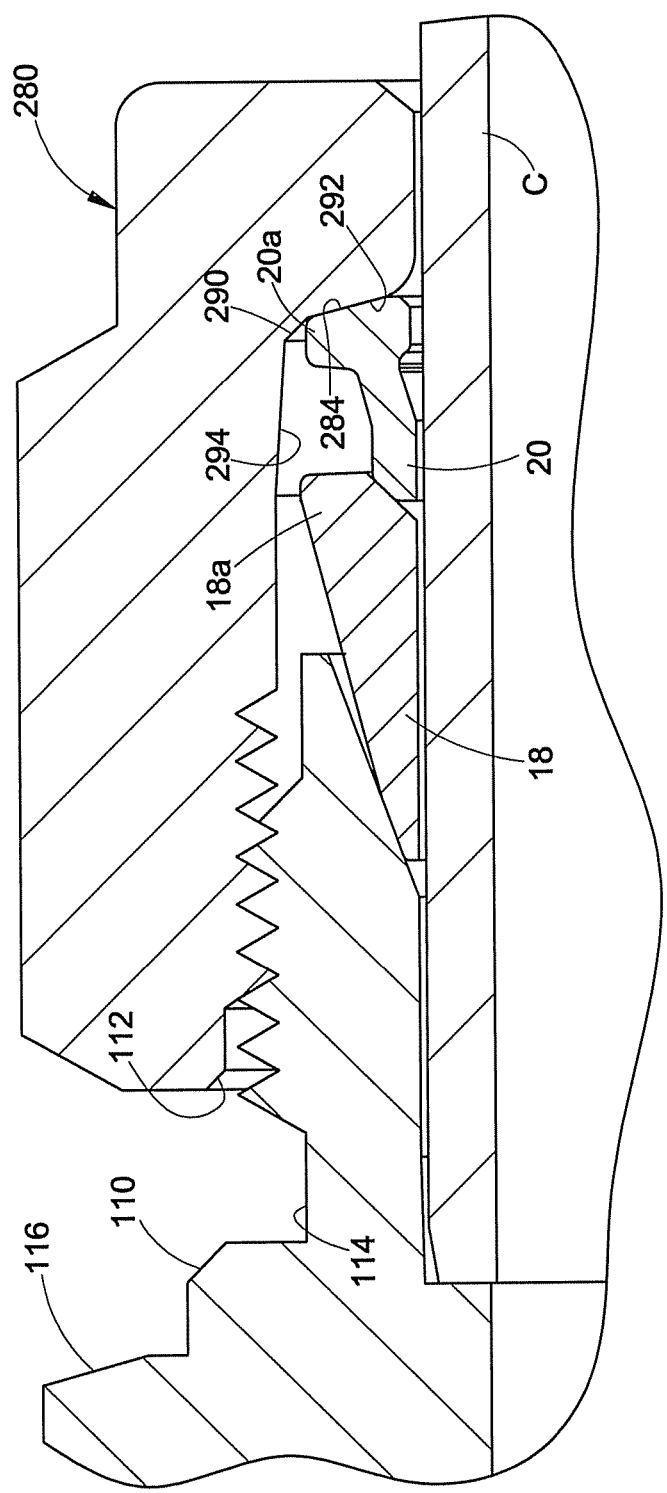
FIG. 14 illustrates an embodiment similar to FIG. 13 but using an integral torque collar.
Figure 15:
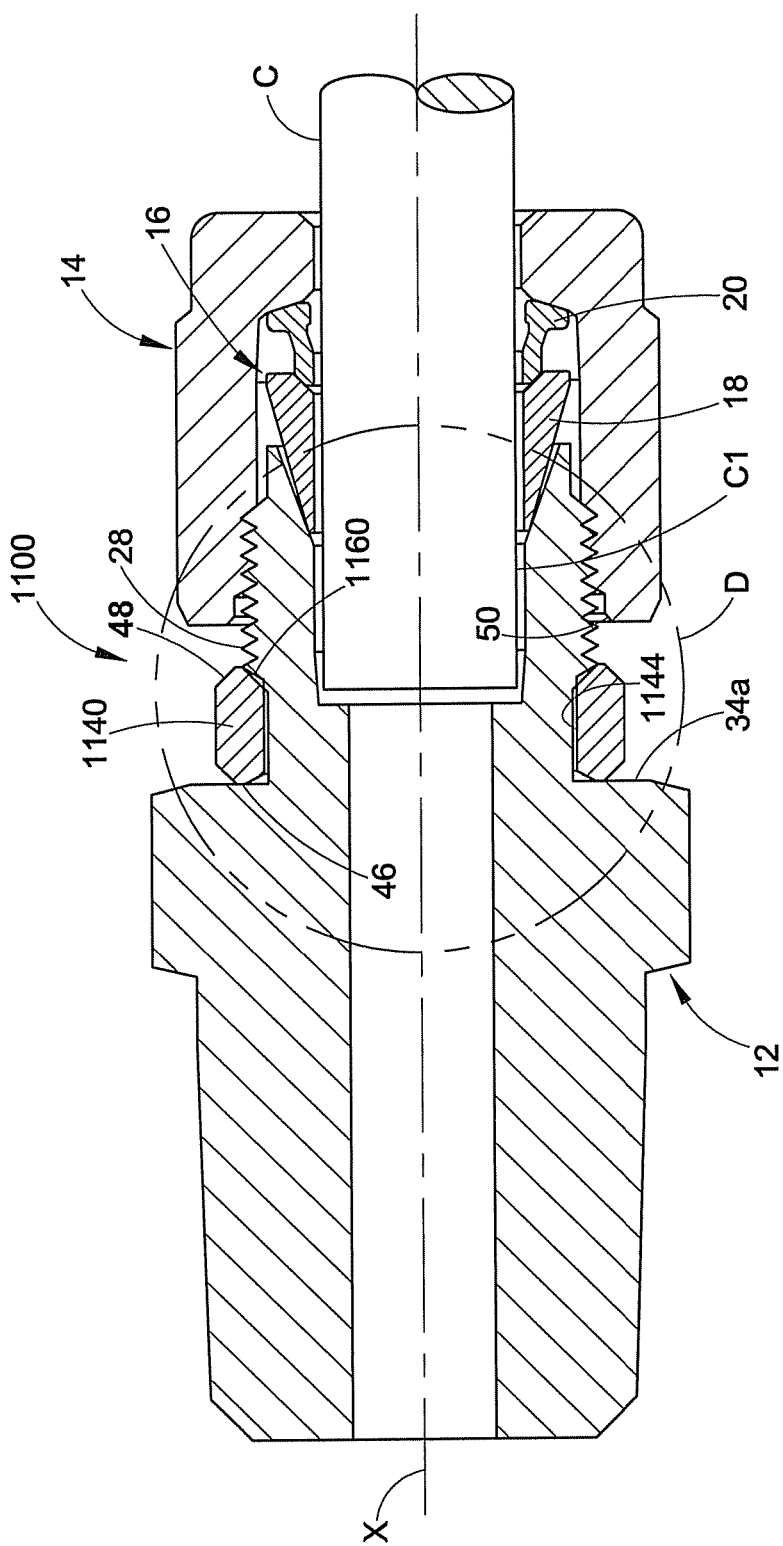
FIG. 15 is another embodiment of a pull up by torque fitting shown in longitudinal cross-section and in a finger-tight position.
Figure 16:
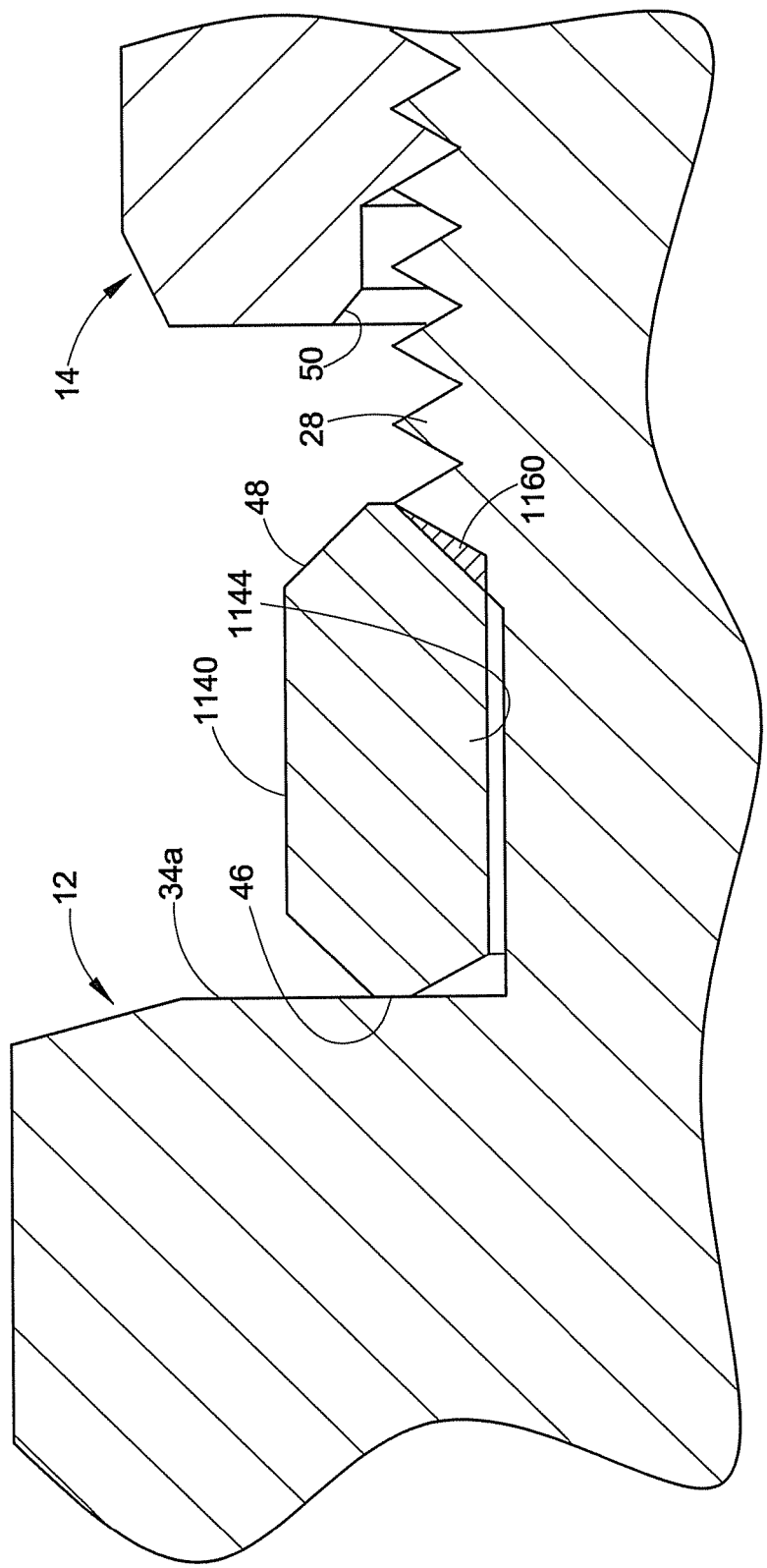
FIG. 16 is an enlarged illustration of the portion of FIG. 15 in circle D.

With reference to FIGS. 13 and 14 we show additional embodiments of a non-integral and integral torque collar, respectively. Most of the components may be the same as the embodiments of FIGS. 3 and 6 and like reference numerals are used for like parts, and the description thereof need not be repeated.

In these embodiments, however, the female nut has been modified and therefore is identified by the numeral 280. It will be noted that the female nut 14 (see FIG. 3 for example) in the other embodiments includes an internal tapered drive surface 282 that makes contact with the drive surface 284 of the back ferrule 20. The drive surface 282 may be tapered at an angle $\Theta$ of about fifteen degrees although the values of $\Theta$ will vary depending on the fitting design, from as small as five degrees or less to about twenty degrees or more.

The drive surface 282 joins to a first cylindrical wall 286 having a sufficient diameter to accommodate the outer flange of the back ferrule 20. A second cylindrical wall 288 may be provided to accommodate the enlarged back portion of the front ferrule 18. In this exemplary fitting, both the back portions of the front and back ferrules expand radially outward during pull-up and may come into contact with the cylindrical walls 286, 288.

Referencing again FIGS. 13 and 14, the nut 280 is modified to include a first tapered centering surface 290 that extends from a radial outer end of the tapered drive surface 292. The centering tapered surface 290 may be formed at an angle $\epsilon$ such as for example 45° although other angles may be used as needed. A suitable range may be, for example, approximately 20° to approximately 60°. The centering tapered surface 290 may contact the back end or rear portion 20a of the back ferrule during either an initial pull-up or during a remake. A second tapered surface 294 may extend from a radial outer end of the centering tapered surface 290.

As explained hereinabove, effective remakes by torque can be achieved by returning the ferrules to their prior position at the just prior pull-up. In some fitting designs, the ferrules may exhibit some spring-back during disassembly, particularly for tube fittings that can accommodate remakes by turns. This results in a need to recover some stroke to reposition the ferrules prior to further tightening at remake. If after disassembly the ferrules are off-center or eccentrically aligned (relative to the axis X) there may be side to side sliding motion as well as the need for additional stroke and torque to remake the fitting. The centering tapered surface 290 can help to realign and center the ferrules and nut, especially the back ferrule, along the X axis so as to reduce loss of stroke to reposition the ferrules. We have discovered that this centering effect can have a dramatic impact on the number of remakes by torque by reducing loss of stroke to remake the fitting. The second tapered surface 294 may also help with centering either or both ferrules and the nut. We have observed a two to three fold increase and more of the number of remakes by torque using the tapered nut concept.

The centering taper and other internal tapers are more fully described in pending PCT application number PCT/US2008/070991 filed on Jul. 24, 2008, for TAPERED NUT FOR TUBE OR PIPE FITTING, published as WO 2009/018079A1 on Feb. 5, 2009, the entire disclosure of which is fully incorporated herein by reference.

The tapered nut concept is especially useful with fitting designs such as used in the exemplary embodiments herein due to the radially inward hinging deformation of the back ferrule during pull-up which causes the rear portion 20a to rotate radially outward away from the conduit wall. However, the use of tapers as set forth herein will benefit other fitting designs and even those that use a single ferrule that bow radially outward. The tapered nut concept will also be readily incorporated into male threaded nuts for female style fittings.

The combination of pull-up by torque therefore can greatly benefit from the optional use of an internally tapered nut as set forth hereinabove. This benefit derives from the tapers centering the nut and ferrules back to their just prior pulled up position to minimize stroke recovery so that the applied torque goes primarily to remaking the fitting with only a small additional relative axial stroke. Moreover, the use of the stroke limiting feature to provide controlled additional relative stroke on remake, works with the tapered nut to facilitate many remakes by minimizing stroke loss due to over-tightening or eccentrically aligned ferrules and nuts.

In other exemplary embodiments, the torque collars and/or the fitting bodies described in this application may optionally be configured to inhibit, prevent or at least make more difficult, removal of a torque collar from the fitting body and/or set the position of the torque collar with respect to the fitting body after installation of the torque collar on the fitting body. The structure or process for inhibiting removal may be any structure or process that makes the torque collar more difficult to remove, any structure or process that prevents the torque collar from being removed, or any structure or process that permanently attaches the torque collar to the fitting body. Inhibiting removal of the torque collar may prevent the torque collar from separating from the fitting body during transport and/or may prevent the torque collar from being manually removed from fitting body after the assembly has been made. The torque collar and/or the fitting body may be configured in a wide variety of different ways to inhibit removal of a torque collar from the fitting body and/or set the position of the torque collar with respect to the fitting body. Examples of ways the torque collar and/or the fitting body may be configured to inhibit removal of a torque collar from the fitting body and/or set the position of the torque collar with respect to the fitting body include, but are not limited to, mechanical arrangements, such as detent mechanisms, thread configurations, friction increasing arrangements (knurling, grooves, etc.), and the like, and bonding, such as gluing, brazing, welding, and the like. Any manner of inhibiting removal of a torque collar from the fitting body and/or setting the position of the torque collar with respect to the fitting body can be employed.

FIGS. 15-17A and B illustrate one exemplary embodiment of a fitting 1100 with a torque collar 1140 and fitting body 12 configured to inhibit removal of a torque collar 1140 from the fitting body 12 and set the position of the torque collar with respect to the fitting body. As will be described in more detail below, in the example illustrated by FIGS. 15-17B, the collar 1140 and/or the fitting body 12 may be configured to inhibit removal of the torque collar by making the torque collar more difficult to remove, preventing the torque collar from being removed, or permanently attaching the torque collar to the to the fitting body. In the embodiment illustrated by FIGS. 15-17B, all parts of the fitting 1100 may be the same and function the same as the embodiment of FIGS. 1-3 (and are given like reference numerals), with the notable exception that in this embodiment a portion of internal threads 1144 of the torque collar 1140 are in engagement with the external threads 28 of the fitting body 12 when the torque collar 1140 is in contact with the body shoulder 34a. An area of engagement 1160 of the torque collar threads 1144 and the fitting body threads 28 is depicted as the cross-hatched region in FIG. 16 and in FIGS. 17A and 17B (note that FIGS. 17A and 17B show the fitting body and the torque collar in a mirror orientation from FIGS. 15 and 16).

In an exemplary embodiment, the torque collar 1140 may be installed on the fitting body 12 by threading the collar threads 1144 onto the fitting body threads 28. The collar threads 1144 and the body threads 28 may be configured such that the torque collar 1140 may be easily spun onto the fitting body 12 until the torque collar 1140 hits a surface of the fitting body 12, for example, a body shoulder 34a, by applying a low torque to the collar 1140. Once the torque collar 1140 hits the body shoulder 34a, the torque required to continue rotating the collar sharply rises. The torque collar 1140 may be rotated or tightened an additional amount after the torque collar engages the body shoulder 34a. This additional rotation or tightening causes the internal threads 1144 that remain in engagement with the external threads 28 to interfere or push against each other as indicated by arrows 1150 in FIG. 17A.

Referring also to FIG. 17B, this interference or pushing causes the internal collar threads 1144 and external body threads 28 that remain in engagement to deform or wedge. This deformation or wedging has the effect of locking or otherwise securing the torque collar 1140 on the fitting body 12, in a manner that is similar to a jam nut. In one embodiment, the deformation or wedging of the body threads 28 and the torque collar threads 1144 may be elastic, such that the torque collar 1140 is inhibited from being removed from the fitting body 12. For example, the elastic deformation or wedging may be used to prevent the torque collar 1140 from being easily spun back off of the fitting body 12 should a similar or low torque (in an opposite direction) be applied that was applied to spin the torque collar onto the fitting body 12. The torque collar 1140 optionally remains removable from the fitting body 12, although an increased amount of torque (as compared to the amount of torque required to spin the torque collar onto the fitting body) may be needed to achieve the removal. As an alternative to an actual elastic deformation or wedging, the interference may be used to produce an increase in friction that is sufficient to make it more difficult to remove the torque collar 1140 as compared to the ease with which it was installed.

In another embodiment, the deformation or wedging of the body threads 28 and/or the torque collar threads 1144 may be plastic or permanent, such that the torque collar 1140 becomes for most intents and purposes permanently attached to the fitting body 12. As a result, the torque collar 1140 cannot back off of the fitting body 12, even if a high removal torque is applied. The forward part of the torque collar 1140 may include the wedge surface 48, and the torque collar 1140 will cooperate with the nut taper surface 50 to provide the same performance features described hereinabove with respect to FIGS. 1-3.

In another exemplary embodiment, optionally no deformation or substantially no deformation occurs between an interface of the fitting body 12 and the torque collar 1140 (other than the threaded engagement) when the torque collar 1140 is rotated onto the torque collar 1140 with the fitting body 12. In the illustrated embodiment, no deformation or substantially no deformation of the body shoulder 34a or the back face 46 of the torque collar 1140 occurs when the torque collar 1140 is rotated onto the torque collar on the fitting body 12. That is, the deformation of the torque collar 1140 and/or the fitting body 12 may be substantially isolated to deformation of the torque collar threads 1144 and/or the body threads 28. As a result, the axial position of the torque collar 1140 with respect to the fitting body 12 may be accurately controlled because of the engagement with the body shoulder 34a. Deformation of the body shoulder 34a and the back face 46 can be inhibited in a wide variety of different ways. For example, the torque collar 1140 and the fitting body 12 may be hardened.

In another embodiment, an interface (for example, an area of contact between the back or outboard face 46 of the torque collar and the body shoulder 34a) between the fitting body 12 and the torque collar 1140 deforms, either plastically or elastically, when the torque collar is rotated so as to secure the torque collar on the fitting body 12. The deformation of the interface may add to the locking effect achieved by the deformation of the collar threads 1144 and the body threads 28 as described above. This deformation may take the form of a high frictional engagement, or coining of the surfaces, or other deformation by which the surfaces are strongly engaged or compressed against each other. Alternatively, the fitting body 12 and the torque collar 1140 may be configured such that the deformation of the interface between the torque collar 1140 and the fitting body 12 alone inhibits removal of the torque collar 1140, and the collar threads 1144 and the body threads 28 are not deformed when the torque collar 1140 is rotated onto the fitting body. The interface between the fitting body 12 and the torque collar 1140 can be configured to deform in a wide variety of different ways. For example, one of the collar 1140 and the fitting body shoulder 34*a* can be configured to indent or coin into the other by reducing the area of contact at the interface (e.g. by providing one or more raised projections, rings, grooves, or knurling) and/or by hardening (e.g. the collar can be hardened). One or both of the collar 1140 and the fitting body 12 may be plastically or elastically deformed at the interface. In an exemplary embodiment, the axial advance of the torque collar 1140 that occurs as a result of the deformation at the interface between the torque collar and the fitting body 12 is preferably controlled, such that the axial position of the torque collar 1140 with respect to the fitting body 12 is controlled.

It may be further noted that the torque collar 1140 need not be a completely solid or continuous annular body. For example, the torque collar 1140 may be a threaded or unthreaded body and also may be a longitudinally split body or even in two halves that would allow a radial or side loading of the torque collar onto the fitting body neck, with a subsequent plastic and/or elastic deformation to fix the collar in place as described herein above.

Figure 18:
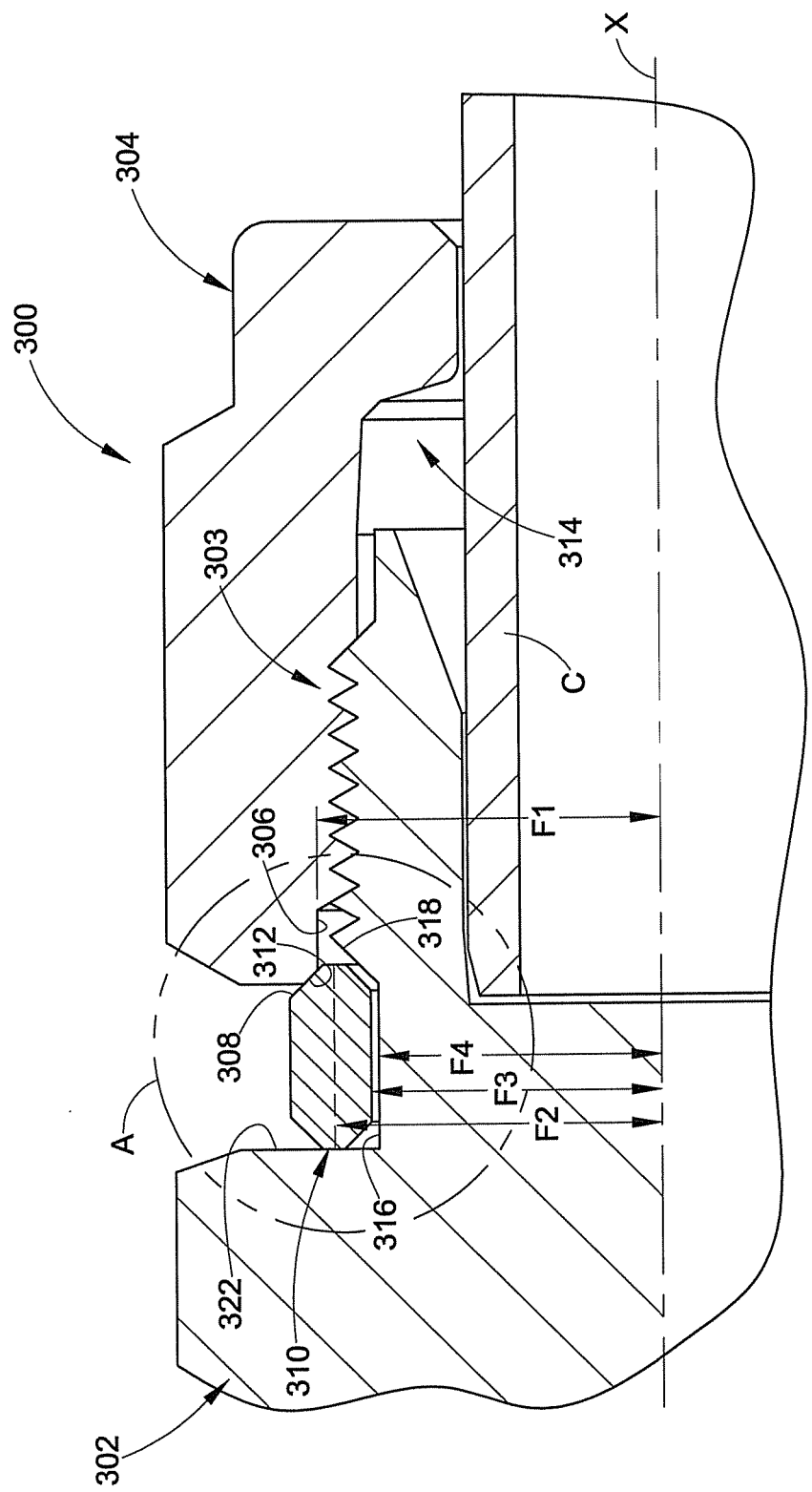
FIG. 18 is another embodiment of a conduit fitting illustrating one or more of the inventions disclosed herein, illustrated in longitudinal cross-section and with the parts installed in a finger-tight position.

With reference to FIG. 18, we illustrate another embodiment of a conduit fitting 300 that may be pulled up by torque, alternatively by turns, or by both methods during different makes and re-makes of the fitting 300. The fitting 300 is illustrated in a finger-tight position installed on a conduit end C, preparatory to tightening to a complete pulled-up position. The fitting 300 in FIG. 18 is similar to the embodiment of FIG. 1 herein (for example, the torque collar 310 may be symmetrical about its axis as in the embodiment of the torque collar 40 of FIG. 1), with the notable differences being discussed below. The ferrules are omitted in FIG. 18 for clarity, however, those skilled in the art will appreciate that a ferrule or ferrules of any suitable design may be used with this fitting 300, including for example, the ferrules illustrated and described with reference to the FIG. 1 embodiment herein. The fitting 300 thus includes a male threaded fitting body 302 and a female threaded nut 304. The fitting body 302 and fitting nut 304 are threaded in a complementary manner so that the nut 304 easily threads onto the body 302 by a threaded engagement 303, as is known.

One of the notable differences between the structural embodiment of FIG. 18 and that of FIG. 1 is that the diameter F1 (the following described diameters are referenced to the longitudinal center axis X of the fitting 300) of the end counterbore 306 of the female nut 304 is preferably—although not necessarily required in all embodiments—larger than the minor diameter F2 of the tapered frusto-conical wedge surface 308 of the torque collar 310. In other words, F1>F2. It is further preferred—again though not required in all embodiments—that this relationship be maintained after the crimping process is carried out on the torque collar 310, as will be further described hereinbelow. By maintaining the relationship F1>F2, we can assure that there is good surface to surface contact between the wedge surface 308 and the inter-engaging nut taper surface 312, for initial pull-up as well as subsequent pull ups and remakes of the fitting 300.

Another notable difference between the embodiments of FIG. 18 and FIG. 1 is in the rear socket 314 of the female threaded nut 304. This socket receives the back portion of a ferrule, for example, the rear ferrule of a two ferrule fitting. The socket 314 may be provided with tapered surfaces that facilitate centering and aligning the back ferrule (not shown, or a suitable single ferrule when alternatively used) as the fitting 300 is tightened past finger-tight position to a completely pulled up position. This centering effect helps to reduce torque caused by the rotational contact between the nut 304 and the back ferrule, as well as the centering alignment of the two ferrules for a two ferrule fitting. Since torque other than that caused by the engagement of the nut 304 and the torque collar 310 may be less than desirable in some applications, the socket 314 concepts may be useful to incorporate in some conduit fittings that are to be pulled up by torque. The various tapered surfaces and functions of the socket 314 are fully described in co-pending International patent application serial No. 10/32524 filed on Apr. 27, 2010 for TAPERED NUT FOR TUBE OR PIPE FITTING, the entire disclosure of which is fully incorporated herein by reference. Further useful disclosures of the tapered nut concepts may be found in International Patent Application No. PCT/US2008/070991 published under International Publication No. WO 2009/018079 A1 on 5 Feb., 2009, which disclosure is also fully incorporated herein by reference. It should be noted that while the particular socket 314 design is preferred in some applications, it is not required in all applications, and other inter-engaging surface geometries between the nut 304 and the ferrule(s) may be used. For example, other embodiments in this disclosure illustrate different socket geometries.

It is also preferred, although again not always required, that the minor diameter F3 of the internal female threads 310*a* of the torque collar 310 (see FIG. 19 for example for the region of the internal female threads 310*a*) be greater than the diameter F4 of the fitting body neck 316, or in other words, F3>F4. This allows for the convenience of having the torque collar be able to freely spin and have radial clearance with the neck 316 after the torque collar 310 has been threadably installed on the neck 316, which radial clearance may facilitate centering of the torque collar 310 as the nut 304 tapered surface 312 engages the torque collar wedge surface 308 during tightening for complete pull-up. It is also preferred, although again not always required, that the relationship F3>F4 be maintained after the crimping process described hereinbelow. This radial clearance also functions to prevent possibly undesired radial side loads against the nut 304 during pull-up of the fitting—thereby reducing undesired torque contributions from the fitting components other than the interface between the nut tapered surface 312 and the wedge surface 308.

It will further be noted that in this embodiment of a fitting and process for preventing or making more difficult the torque collar 310 from being easily removed from the fitting body 302 after installation thereon, the torque collar 310 may be fully threaded onto the body neck 316 so that preferably the threads 310*a* of the torque collar 310 do not engage or make contact with the male threads 318 of the body 302, either before and, preferably after, the crimping process. This may be realized, for example, but appropriate selection of the maximum axial length of the torque collar 310 (labeled L in FIG. 19 for example) being less than the axial length L2 (FIG. 19) of the neck 316, which in this embodiment is the axial distance between the fitting body shoulder (322 in FIG. 18) and the innermost end 318*a* of the fitting body threads 318.

Figure 19:
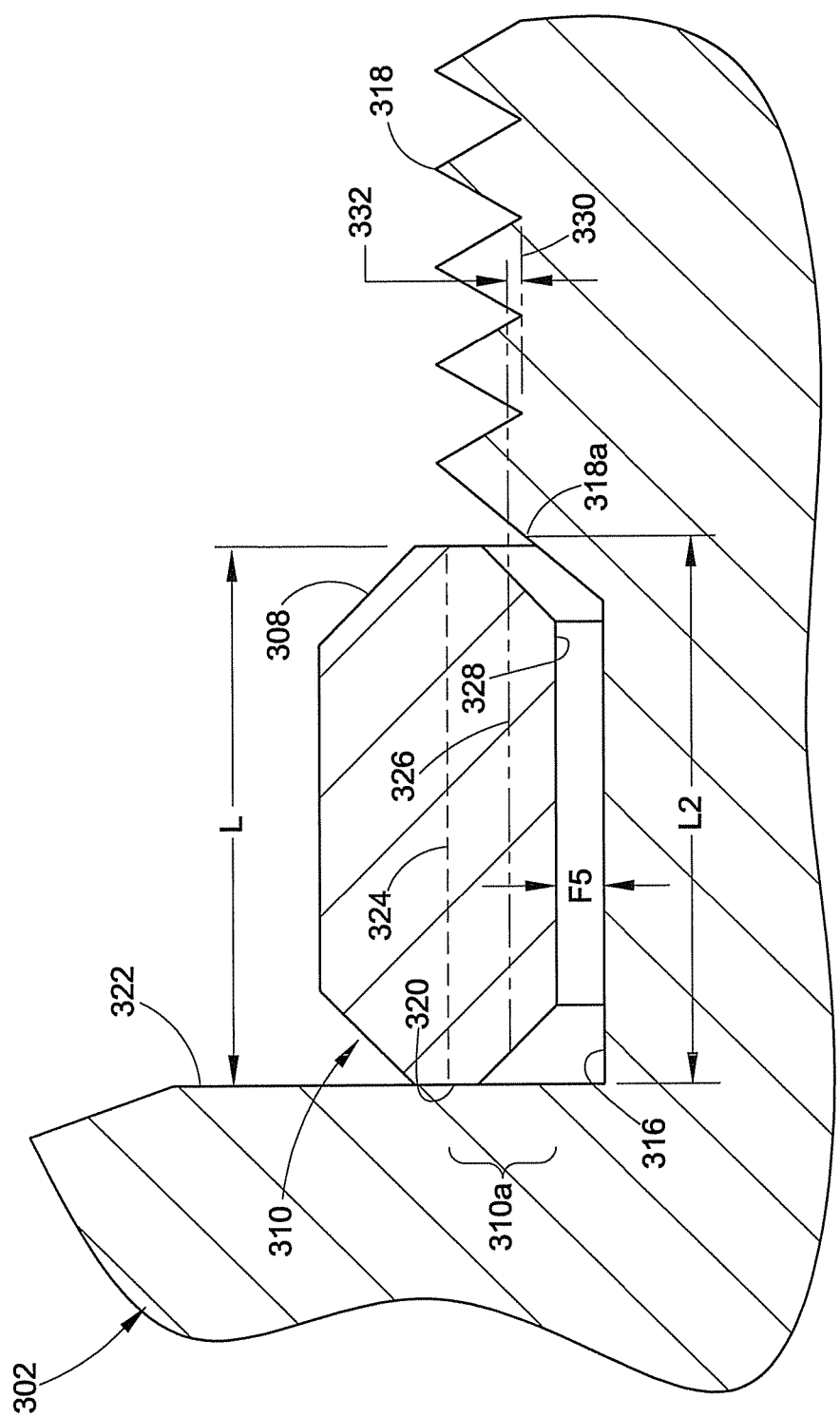
FIG. 19 is an enlarged view of the circled area A in FIG. 18, prior to an exemplary crimping process being performed on the torque collar.
Figure 20:
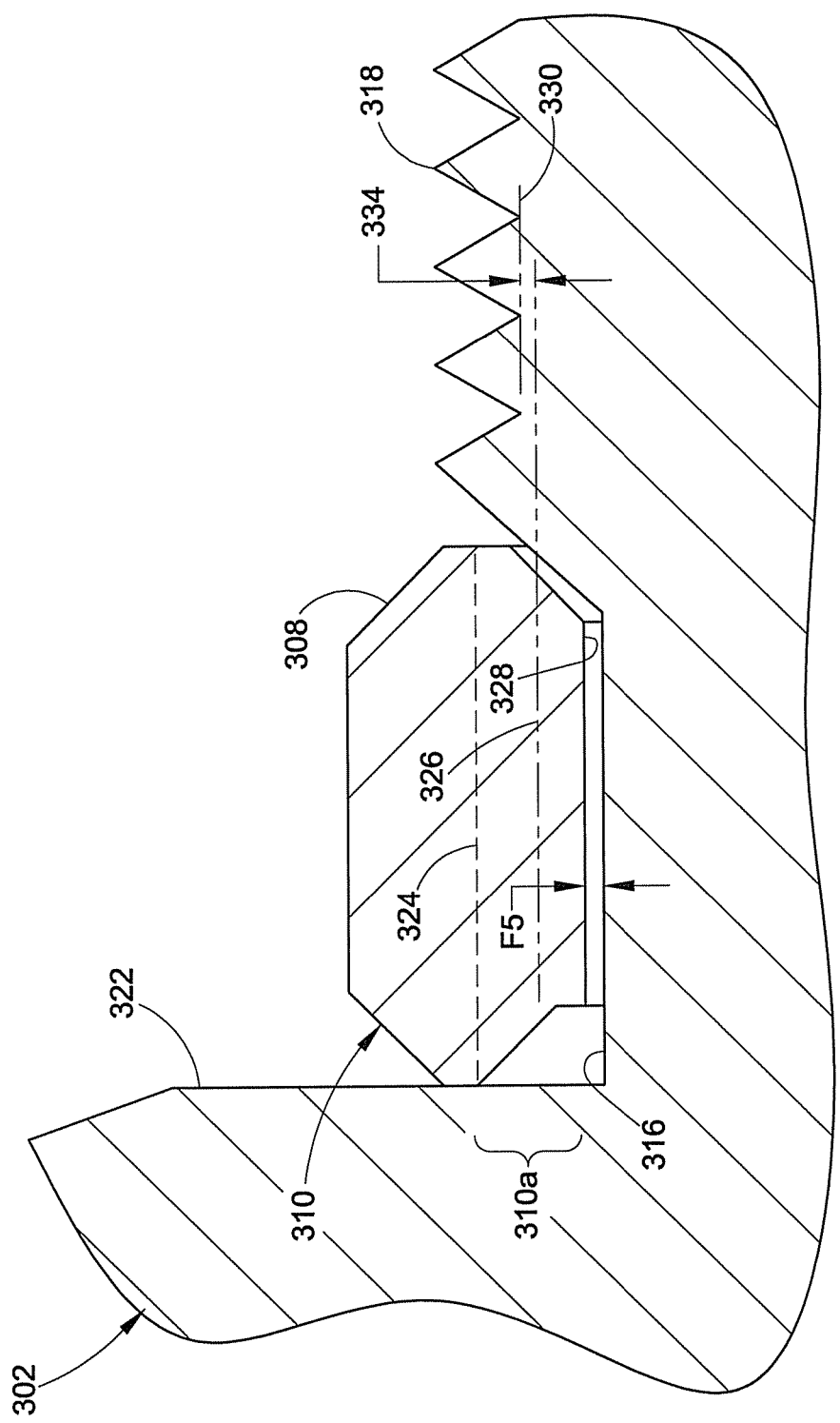
FIG. 20 is an enlarged view of the circled area A in FIG. 18, after an exemplary crimping process has been performed on the torque collar.

Turning next to FIGS. 19 and 20, we illustrate the effect of an optional crimping process that may be used to prevent the torque collar 310 from being threadably removed from the fitting body, or at least to make it more difficult to remove the torque collar 310 or to reduce the opportunity for inadvertent or unintentional removal or reverse spinning of the torque collar off the body 302. Note in FIGS. 19 and 20 that the female threaded nut 304 has been omitted for clarity.

In FIG. 19, the torque collar 310 has been spun onto the fitting body 302 by threaded engagement of the female threads 310a with the fitting body male threads 318, and axially past the threads 318 so that the torque collar 310 is freely received about the neck 316. The torque collar forward face 320 may but need not engage or touch a shoulder 322 of the fitting body that defines the outer end of the neck 316. This may be a typical position of the torque collar 310 prior to being crimped. The major diameter location of the torque collar female threads 310a is represented by the dashed line 324, the pitch diameter location of the torque collar female threads 310a is represented by the broken dashed line 326 and the minor diameter location of the torque collar female threads 310a is referenced with the numeral 328.

It is preferred, although not required in all embodiments, that the pitch diameter of the torque collar threads 310a, as indicated with position line 326, be somewhat greater than the pitch diameter of the male threads 318 of the fitting body 302. The pitch diameter location for the fitting body male threads 318 is represented by the line 330. This difference in pitch diameters between the torque collar 310 and the fitting body male threads 318 prior to crimping is therefore exhibited as a distance or radial clearance 332 in FIG. 19. We thus prefer to minimize the pitch diameter of the torque collar 310 internal threads 310a so that we can reduce or minimize the percent crimping needed so as to assure that the crimping process will result in the torque collar 310 threads 310a interfering with the male threads 318 of the fitting body 302, thereby preventing the torque collar 310 from easily spinning back off of the fitting body after the crimping process has been completed. By having the pitch diameter of the torque collar 310 threads 310a somewhat initially (precrimp) larger than the pitch diameter of the fitting body threads 318, we can reduce the percent crimp needed to cause the thread interference while at the same time allowing radial clearance between the torque collar 310 and the fitting body neck 316 after crimping. The post-crimping radial clearance between the torque collar 310 and the neck 316 may optionally be further facilitated by selecting torque collar threads 310a near the high end of the allowed range (i.e. tolerance) for the minor thread diameter.

As an example, for a typical quarter-inch fitting (meaning about a nominal quarter-inch conduit outer diameter), the diameter of the neck 316 may be about 370 mils, the pitch diameter of the fitting body male threads 318 may be about 404 mils, the major diameter of the male threads 318 may be about 430 mils, the un-crimped pitch diameter of the torque collar threads 310a may be about 407 mils, and the minor diameter 328 of the torque collar threads 310a may be about 390 mils. There thus is a radial clearance F5 between the un-crimped torque collar 310 and the neck 316 of about 10 mils. A crimping process may then be carried out by which a preferably generally uniform radial compressive force is applied to the torque collar 310 (while the torque collar is about the neck 316) so as to reduce the pitch diameter of the torque collar threads 310a, and by consequence the pitch diameter of the torque collar threads, so as to cause the torque collar threads 310a to interfere with the fitting body threads 318 to prevent the torque collar 310 from spinning back off the fitting body, either intentionally or unintentionally. This effect of the crimping process is illustrated in the example of FIG. 20 which illustrates the arrangement of FIG. 19 after crimping the torque collar 310. Note that after crimping, the radial clearance F5 has been reduced but still allows the torque collar 310 to present no radial load against the neck 316 when the fitting is pull-up. Also it will be noted that after crimping the pitch diameter of the torque collar 310 is less than the pitch diameter of the fitting body threads 318, as represented by the radial interference 334 in FIG. 20.

Although not shown in FIG. 20, after crimping it may be preferred though not required that the tapered surface 312 of the fitting nut 304 will make full surface to surface contact with the wedge surface 308 of the torque collar 310.

For any particular design and application, the percent crimp, the amount of interference to substantially prevent removing the torque collar 310 from the fitting body 302 by reverse spinning, and the amount of radial clearance—if any—desired between the torque collar 310 and the neck 316, may be chosen as needed by the designer. In some embodiments, it may be desired to simply make it more difficult for someone to remove the torque collar 310 by reverse spinning, in other words have only a slight interference between the torque collar threads and the male nut threads 318 so that the torque collar will not inadvertently back off the fitting nut 302 (for example from vibration during handling or shipping), but allowing for the ability to remove the torque collar 310 albeit with more difficulty than would otherwise present itself.

In the present example, the crimping process may reduce both the pitch diameter and the minor diameter of the torque collar threads 310a by about 10 mils so that after crimping the minor diameter may be about 380 mils, or about a 2.5% reduction. This reduction will cause the desired interference with the fitting body threads 318 because the pitch diameter of the torque collar 310 will also have been reduced by about 10 mils to a value about 397 mils which is less than the 404 mils of the male threads 318. This crimping amount, however, still allows about 5 mils radial clearance between the torque collar 310 and the neck 316. In the exemplary embodiment, it may be further preferred but not required in all embodiments or applications, to control the machining and/or selection process for the torque collar 310 in order to have a torque collar pitch diameter that is only somewhat larger than the fitting body pitch diameter (in this example, about 3 mils) so as to minimize the percent crimping needed to cause interference while allowing post-crimp radial clearance between the torque collar 310 and the neck 316. For example, torque collars may be selected or machined that are at the low end of the allowed range (i.e. tolerance) of the thread pitch diameter so as to be slightly larger than the pitch diameter of the fitting body male threads 318. Additionally or alternatively, torque collars may be selected or machined that are at the high end of the allowed range (i.e. tolerance) of the minor diameter or even oversized on the minor diameter to allow a higher percent crimping while still providing a radial clearance post-crimp between the torque collar 310 and the neck 316. However, these preferred selection features may not be needed in all embodiments and applications of the inventions herein. In some cases it may not be needed to maintain a desired amount of post-crimp radial clearance between the torque collar 310 and the neck 316, or there may not need to be as tight a control on the percent crimp performed.

The values given in the example above are only intended to be exemplary in order to explain the concept, and may be different for various quarter-inch fittings, and include different tolerances. The exemplary numbers also will be different for different size fittings, of course, and in particular the percent crimp performed may vary with fitting size and also be changed depending on particular applications and uses of the fittings.

Any suitable crimping process may be used. For example, a commercially available crimping device may be used, such as a heavy duty air-operated fixture part no. 3198A41 available from McMaster-Carr, along with a standard 5C collet part no. 3223A442 also available from McMaster-Carr. Other well known crimping processes and devices that may be used include but are not limited to hose crimping devices, nut crimping devices, pneumatically powered three jaw chuck devices and so on may be used, or those later developed. Although it is preferred that the radial crimping be generally uniform along the longitudinal axis X of the torque collar 310, such may not be required in all embodiments or applications. Also, as used herein "generally uniform crimping" does not require that the crimping force be applied generally uniformly across the entire outer surface of the torque collar 310 along the axis X. For example, many crimping devices use discreet jaws that engage the surface to be crimped at respective locations along the surface being crimped. Thus for example, a torque collar may be adequately crimped without the entire minor diameter and pitch diameter across the entire torque collar threads being radially displaced. Also, less than the entire axial length of the torque collar 310 may be crimped. It is further contemplated that any radial compression technique may be used whether such technique would be considered "crimping" in the art. We intend the term "crimp" to be broadly interpreted to include any radial compression technique that results in a reduction in the internal diameter of one or more internal surfaces of the torque collar 310. As with the above described exemplary alternative embodiments, the torque collar 310 may be a split body or two or more parts that are assembled so as to allow the torque collar 310 to be radially or side loaded onto the fitting body neck 216 if so desired.

In still a further alternative embodiment, one or both ends of the torque collar may be provided with plastically deformable end, for example tabs or extensions, that are radially bent either by a crimping process or by engagement with the nut 14 during pull-up. In this manner, the torque collar may be a self-staking or self-crimping body so as to allow for the optional benefit of not requiring a separate crimping process.

In addition to the optional socket 314 geometry (FIG. 18), other torque reducing options for pull-up that may be used include the use of a lubricant between the inter-engaging tapered surface 312 of the fitting nut 304 and the wedge surface 308 of the torque collar 310. This lubricant may be any suitable lubricant, and we have found that a thin film of hydrocarbon oil or other higher molecular weight oils or solid lubricants such as PTFE, high density polyethylene and per fluorocarbon oil are especially useful for use with, but not limited to use with, torque collars and fitting bodies made from high nickel content alloys. Plating such as, for example, silver plating, may alternatively be used.

The various concepts (such as the use of a lubricant in the inter-engaging surfaces with the torque collar and nut or body, the nut socket profile or geometry, differential hardness between the torque collar and the nut or body inter-engaging tapered surfaces, and the radial clearance between the torque collar and neck of the body—each either individually or in any number of selected combinations) disclosed herein for optional use to reduce torque contributions other than due to the inter-engaging surfaces of the torque collar with either the nut or body, can be thought of as helping provide a tighter or narrower range between torque and nut rotation such as illustrated in the exemplary illustration of FIG. 3A herein. This may be especially so for the transition region AB between the gradual torque increase A and the more distinct torque increase B, for example. In many applications and embodiments, it may be desirable to tighten this transition region AB, meaning the more distinct and sharper the relationship between the torque increase and turns, particularly the slope B versus the turns or fractional turns needed to transition from slope A to slope B. The relationship then between torque and turns, especially in the transition region, is desirably attributable as much as possible to the inter-engaging surfaces of the torque collar and the nut or body, rather than other factors that may increase torque during pull-up of the fitting.

Still further we have found that it may be preferred in many applications or embodiments, although not necessarily required in all embodiments, to form the torque collar 310 (as well as other torque collar embodiments described herein) of a material that is softer than the material used for the nut 304. In other words, we have found that the use of a differential hardness between the torque collar and the engaging nut may facilitate remakes to the same torque values. The differential hardness may further be used, as an alternative embodiment, mainly in the region of the inter-engaging surfaces 308 and 312 of the torque collar and the nut. The differential hardness may be realized, for example, by softening the material of the torque collar or starting with a material that is softer than the material of the nut, or hardening the nut, particularly in the region of the tapered surface 312, or both may be used in some embodiments. For example, in the case of stainless steel alloys, optionally thermally annealing the torque collar 310 to a hardness less than about 70 HRB (Rockwell hardness scale) after the torque collar has been machined, for example from bar stock, may in some cases facilitate re-makes to the same torque. A typical 316 stainless steel nut may have a hardness of 20-25 HRC. Known annealing processes suitable for use include but are not limited to vacuum annealing and hydrogen bright annealing. Other alternatives to annealing and alternative materials for the torque collar 310 include but are not limited to sintered powdered metals and metal injection molding (MIM) parts.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A method of assembly for a conduit fitting, comprising:
providing a fitting body that can be threadably joined with a fitting nut,
providing a torque collar,
disposing the torque collar onto the fitting body;
radially compressing at least a portion of the torque collar after the torque collar is disposed onto the fitting body but prior to fitting body being joined with the fitting nut whereby said radial compression interferes with separation of the torque collar from the fitting body.

2. The method of claim 1 comprising the steps of forming male threads on a portion of the fitting body, forming female threads in a portion in the torque collar, and threadably joining the torque collar and the fitting body by engaging said male and female threads.

3. The method of claim 2 wherein the step of radially compressing at least a portion of the torque collar includes a radial compression that results in the female thread pitch diameter being less than the male thread pitch diameter.

4. The method of claim 2 comprising the step of providing an unthreaded portion of the fitting body inboard of the threaded portion of the fitting body so that after the torque collar is threadably joined to the fitting body, the torque collar aligns with the non-threaded portion of the fitting body.

5. The method of claim 4 wherein after radial compression of at least a portion of the torque collar, the torque collar compressed portion has a radial clearance from the unthreaded portion of the fitting body.

6. A method of assembly for a conduit fitting, comprising:
providing a fitting body that can be threadably joined with a fitting nut,
providing a torque collar,
disposing the torque collar onto the fitting body;
deforming at least a portion of one of the fitting body and the torque collar after the torque collar is disposed onto the fitting body but prior to the fitting body being joined with the fitting nut, whereby said deformation interferes with separation of the torque collar from the fitting body.

7. The method of claim 6 wherein the step of deforming comprises plastically deforming a surface of the torque collar.

8. The method of claim 6 comprising deforming threads of the torque collar.

9. The method of claim 6 comprising radially compressing the torque collar.

10. The method of claim 6 comprising the step of forming threads on the torque collar having a first thread pitch diameter, forming threads on the fitting body having a second thread pitch diameter, and wherein the step of deforming comprises a radial compression so that the first thread pitch diameter is less than the second thread pitch diameter.

* * * * *